US010696885B2

(12) United States Patent
Kim et al.

(10) Patent No.: US 10,696,885 B2
(45) Date of Patent: Jun. 30, 2020

(54) MOLECULARLY ENGINEERED HIGH THERMAL CONDUCTIVITY POLYMERS AND METHODS FOR MAKING THE SAME

(71) Applicant: The Regents of the University of Michigan, Ann Arbor, MI (US)

(72) Inventors: Jinsang Kim, Ann Arbor, MI (US); Chen Li, Ann Arbor, MI (US); Apoorv Shanker, Ann Arbor, MI (US); Kevin Pipe, Ann Arbor, MI (US); Gun-Ho Kim, Ulsan (KR)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 16/002,809

(22) Filed: Jun. 7, 2018

(65) Prior Publication Data
US 2018/0355233 A1 Dec. 13, 2018

Related U.S. Application Data

(60) Provisional application No. 62/517,487, filed on Jun. 9, 2017.

(51) Int. Cl.
| | |
|---|---|
| C08F 26/10 | (2006.01) |
| C08F 20/06 | (2006.01) |
| C09K 5/14 | (2006.01) |
| C08K 3/08 | (2006.01) |
| C08J 5/18 | (2006.01) |
| C09D 139/06 | (2006.01) |

(Continued)

(52) U.S. Cl.
CPC ............... C09K 5/14 (2013.01); C08F 20/06 (2013.01); C08F 26/10 (2013.01); C08J 5/18 (2013.01);

(Continued)

(58) Field of Classification Search
CPC . C09K 5/14; C08F 26/10; C08F 20/06; C08F 3/08

(Continued)

(56) References Cited

U.S. PATENT DOCUMENTS

| 9,353,919 B2 | 5/2016 | Wu | |
|---|---|---|---|
| 2004/0258900 A1* | 12/2004 | Simon | ..................... B32B 18/00 428/293.4 |

(Continued)

OTHER PUBLICATIONS

Kim, et.al; High thermal conductivity in amorphous polymer blends by engineered interchain interactions; Nov. 24, 2014; Nature materials, whole document (Year: 2014).*

(Continued)

*Primary Examiner* — Tahseen Khan
(74) *Attorney, Agent, or Firm* — Harness, Dickey & Pierce, P.L.C.

(57) ABSTRACT

Methods of increasing thermal conductivity of a bulk polymer are provided. The methods include contacting a bulk polyelectrolyte polymer comprising an ionizable repeating pendant group with an aqueous liquid having a pH that ionizes the pendant group and isotropically extend the polyelectrolyte polymer to an extended non-globular chain conformation. The polyelectrolyte polymer so treated thus exhibits a thermal conductivity of greater than or equal to about 0.6 W/m·K and optionally greater than or equal to about 1 W/m·K. In other aspects, the present disclosure provides a high thermal conductivity material comprising a bulk polyelectrolyte polymer bearing a repeating charged group and having an extended non-globular chain conformation and that exhibits a thermal conductivity of greater than or equal to about 0.6 W/m·K and optionally greater than or equal to about 1 W/m·K. The high thermal conductivity material may be used in electronic devices, including as housings/encapsulation and thermal interfaces.

20 Claims, 12 Drawing Sheets

Figure 1A:
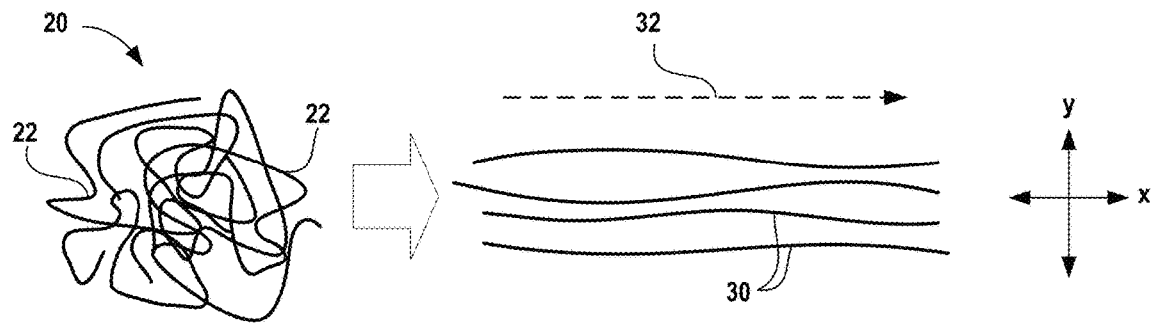

(51) Int. Cl.
*C09D 133/02* (2006.01)
*B29C 71/02* (2006.01)
*B29C 41/04* (2006.01)
*B29K 33/04* (2006.01)

(52) U.S. Cl.
CPC .............. *C08K 3/08* (2013.01); *C09D 133/02* (2013.01); *C09D 139/06* (2013.01); *B29C 41/045* (2013.01); *B29C 71/02* (2013.01); *B29C 2071/022* (2013.01); *B29K 2033/04* (2013.01); *B29K 2039/06* (2013.01); *B29K 2995/0013* (2013.01); *C08J 2333/08* (2013.01); *C08J 2339/06* (2013.01); *C08K 2003/0831* (2013.01); *C08K 2003/0881* (2013.01); *C08K 2201/001* (2013.01)

(58) Field of Classification Search
USPC ......................................................... 428/220
See application file for complete search history.

(56) References Cited

U.S. PATENT DOCUMENTS

| | | | | |
|---|---|---|---|---|
| 2007/0054105 A1* | 3/2007 | Hsiao | .................. | H01L 23/3733 428/292.1 |
| 2014/0120255 A1* | 5/2014 | Lee | ........................ | C23C 18/30 427/214 |
| 2014/0231700 A1* | 8/2014 | Kotani | ................... | C08K 3/013 252/74 |
| 2014/0284075 A1* | 9/2014 | Suzuki | ..................... | C08K 3/14 174/110 R |
| 2016/0003424 A1* | 1/2016 | Wu | ....................... | H01L 33/504 313/503 |
| 2016/0137533 A1* | 5/2016 | Na | ...................... | C02F 1/46109 205/759 |
| 2017/0022345 A1* | 1/2017 | Dufour | ................ | B01J 13/0091 |

OTHER PUBLICATIONS

Gidley, David W. et al., "Position Annihilation as a Method to Characterize Porous Materials," *Annu. Rev. Mater. Res.*, 36, 2006, pp. 49-79. doi: 10.1146/annurev.matsci.36.111904.135144.

Kim, Gun-Ho et al., "High thermal conductivity in amorphous polymer blends by engineered interchain interactions," *Nature Materials*, vol. 14, Mar. 2015, pp. 295-300; DOI:10.1038NMAT4141.

Wei, Xingfei et al., *Phys. Chem. Chem. Phys.*, 2016, DOI: 10.1039/C6CP06643G. 28 pages.

* cited by examiner

MOLECULARLY ENGINEERED HIGH THERMAL CONDUCTIVITY POLYMERS AND METHODS FOR MAKING THE SAME

CROSS-REFERENCE TO RELATED APPLICATIONS

This application claims the benefit of U.S. Provisional Application No. 62/517,487 filed on Jun. 9, 2017. The entire disclosure of the above application is incorporated herein by reference.

FIELD

The present disclosure relates to molecularly engineered high thermal conductivity polymers, high thermal conductivity materials incorporating such molecularly engineered high thermal conductivity polymers, devices incorporating such high thermal conductivity materials, such as electronic device encapsulation and thermal interfaces made from high thermal conductivity materials, and methods for making the same.

BACKGROUND

This section provides background information related to the present disclosure which is not necessarily prior art.

For many polymer applications, such as packaging of light emitting diodes (LEDs) and other electronic devices, high thermal conductivity is an important property that assists with dissipating heat efficiently to maintain the functionality or reliability of a device or system. While uniaxially extended chain morphology has been shown to significantly enhance thermal conductivity in individual polymer chains and fibers, bulk polymers with thermodynamically favorable coiled and entangled chains have low thermal conductivities (e.g., κ=about 0.1 to about 0.4 W/m·K).

While the mechanisms of thermal transport in amorphous materials continue to be studied, it is generally believed that low thermal conductivities (κ) in plastics arise from highly inefficient packing of curvilinear polymer chains with bends, kinks and chain ends into an entangled structure with voids and weak inter-chain non-bonded (van der Waals, dipolar-dipolar) interactions. Thus, low thermal conductivities in bulk polymers are believed to occur due to entangled structures. Blending with high-κ fillers such as metal or ceramic particles, carbon nanotubes (CNTs), or graphene flakes is the most commonly used method to enhance thermal conductivity for materials that incorporate polymers that otherwise have low thermal conductivity. However, the large volume fraction of fillers required to achieve appreciable enhancement in thermal conductivity (κ) often leads to undesired optical or electrical properties, increased weight, high cost, or loss of the easy processability generally associated with polymers. Providing simple and inexpensive methods of forming bulk polymers with high thermal conductivity would be desirable.

SUMMARY

This section provides a general summary of the disclosure, and is not a comprehensive disclosure of its full scope or all of its features.

In certain aspects, the present disclosure provides method of increasing thermal conductivity of a bulk polymer. The method may comprise contacting a bulk polyelectrolyte polymer comprising a repeating ionizable pendant group with an aqueous liquid having a pH that ionizes the pendant group and isotropically extends the polyelectrolyte polymer to an extended non-globular chain conformation. The polyelectrolyte polymer so treated thus exhibits a thermal conductivity of greater than or equal to about 0.6 W/m·K.

In a further aspect, the contacting with the aqueous liquid having the pH increases a thermal conductivity of the bulk polyelectrolyte polymer by at least four times greater than an initial thermal conductivity prior to the contacting.

In a further aspect, the contacting with the aqueous liquid having the pH occurs until a relative viscosity ($\eta_r$) of the bulk polyelectrolyte polymer to water is greater than or equal to about 6.5.

In a further aspect, the contacting further comprises combining the bulk polyelectrolyte polymer with the aqueous liquid and at least one acid or base to form an admixture.

In a further aspect, the bulk polyelectrolyte polymer is a polyanion and at least one base is added to the aqueous liquid to increase pH to greater than or equal to about 12.

In a further aspect, the bulk polyelectrolyte polymer comprises polyacrylic acid (PAA).

In a further aspect, the bulk electrolyte polymer is present at greater than or equal to about 0.5% by weight to less than or equal to about 2% by weight in the aqueous liquid.

In a further aspect, the method further comprises spin casting the admixture onto a substrate to form a spin-cast solid film of the polyelectrolyte polymer having the extended non-globular chain conformation with the thermal conductivity of greater than or equal to about 1 W/m·K.

In a further aspect, the spin-cast film has a thickness of greater than or equal to about 10 nm to less than or equal to about 35 nm.

In a further aspect, the method further comprises blade coating the admixture onto a substrate to form a blade-coated solid film of the polyelectrolyte polymer having the extended non-globular chain conformation with the thermal conductivity of greater than or equal to about 0.6 W/m·K.

In a further aspect, the blade-coated film has a thickness of greater than or equal to about 1.5 μm to less than or equal to about 6 μm.

In a further aspect, the bulk polyelectrolyte polymer is a polycation and at least one acid is added to the aqueous liquid to reduce pH to less than or equal to about 5.

In other aspects, the present disclosure provides a high thermal conductivity material comprising a bulk polyelectrolyte polymer bearing a repeating charged pendant group and having an extended non-globular chain conformation and that exhibits a thermal conductivity of greater than or equal to about 0.6 W/m·K.

In a further aspect, the polyelectrolyte polymer comprises a polycation.

In a further aspect, the polyelectrolyte polymer comprises a polyanion.

In a further aspect, the polyelectrolyte polymer comprises polyacrylic acid (PAA) and the repeating charged pendant group comprises a carboxylate ion.

In a further aspect, the thermal conductivity is greater than or equal to about 1 W/m·K.

In a further aspect, the high thermal conductivity material is in the form of a solid film having a thickness of greater than or equal to about 10 nm to less than or equal to about 35 nm.

In a further aspect, the high thermal conductivity material is in the form of a solid film having a thickness of greater than or equal to about 1.5 μm to less than or equal to about 6 μm.

In a further aspect, the high thermal conductivity material further comprises a high thermal conductivity particle selected from the group consisting of: metal particles, ceramic particles, carbon nanotubes (CNTs), and graphene flakes.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1B:
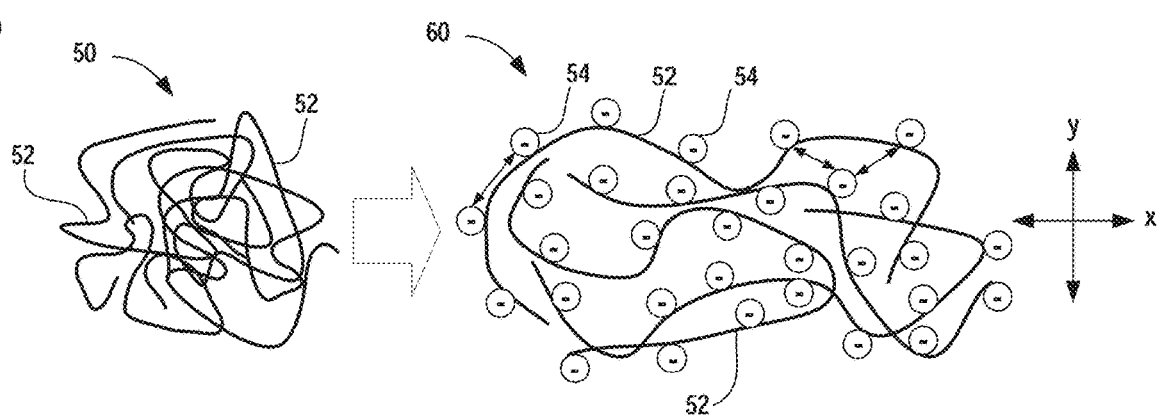
Figure 1C:
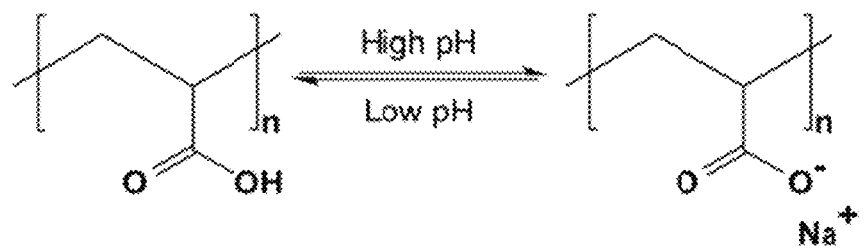
Figure 1D:
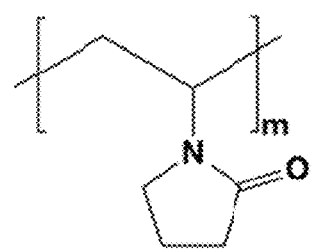
Figure 1E:
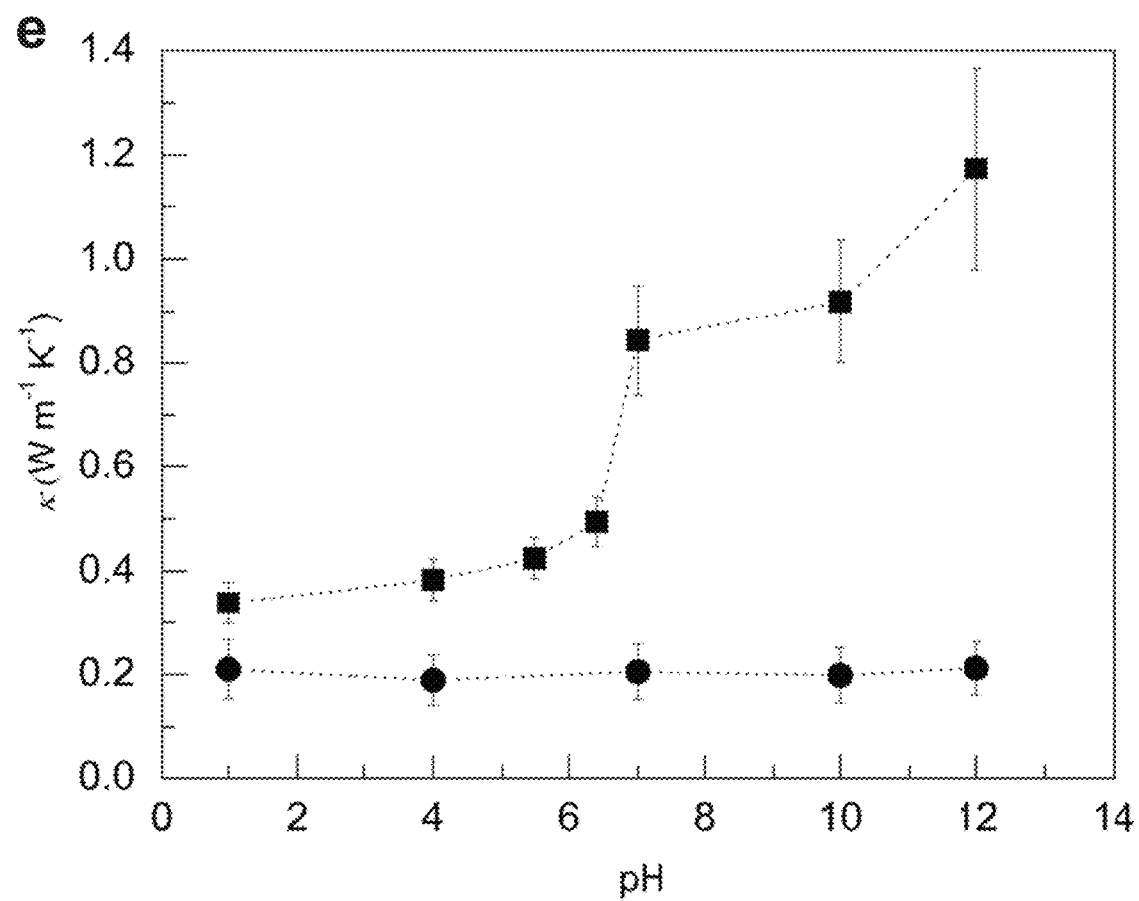

FIGS. 1A-1E show high thermal conductivity in polyelectrolytes via controlled chain extension according to certain aspects of the present disclosure. FIG. 1A shows an illustration of high thermal conductivity achieved in a single alignment direction of polymer fibers through mechanical stretching and chain alignment. FIG. 1B shows an illustration of high thermal conductivity achieved in a polyelectrolyte system through controlled ionization induced polymer chain extension in multiple directions according to certain variations of the present disclosure. FIG. 1C shows a chemical structure of polyacrylic acid (PAA, MW 100 kDa) having a pendant carboxylic acid group and carboxylate at low pH and high pH. pH is adjusted by adding 1M HCl or 1M NaOH solution to the polymer solution. FIG. 1D shows a chemical structure of a non-ionizable water-soluble polymer, poly(N-vinyl pyrrolidone) (PVP, MW 40 kDa). FIG. 1E shows cross-plane thermal conductivity of PAA (squares) and PVP (circles) thin films spin-cast from polymer solutions of different pH. Error bars are calculated based on uncertainties in film thickness, temperature coefficient of electrical resistance for the heater, and heater width.

Figure 2A:
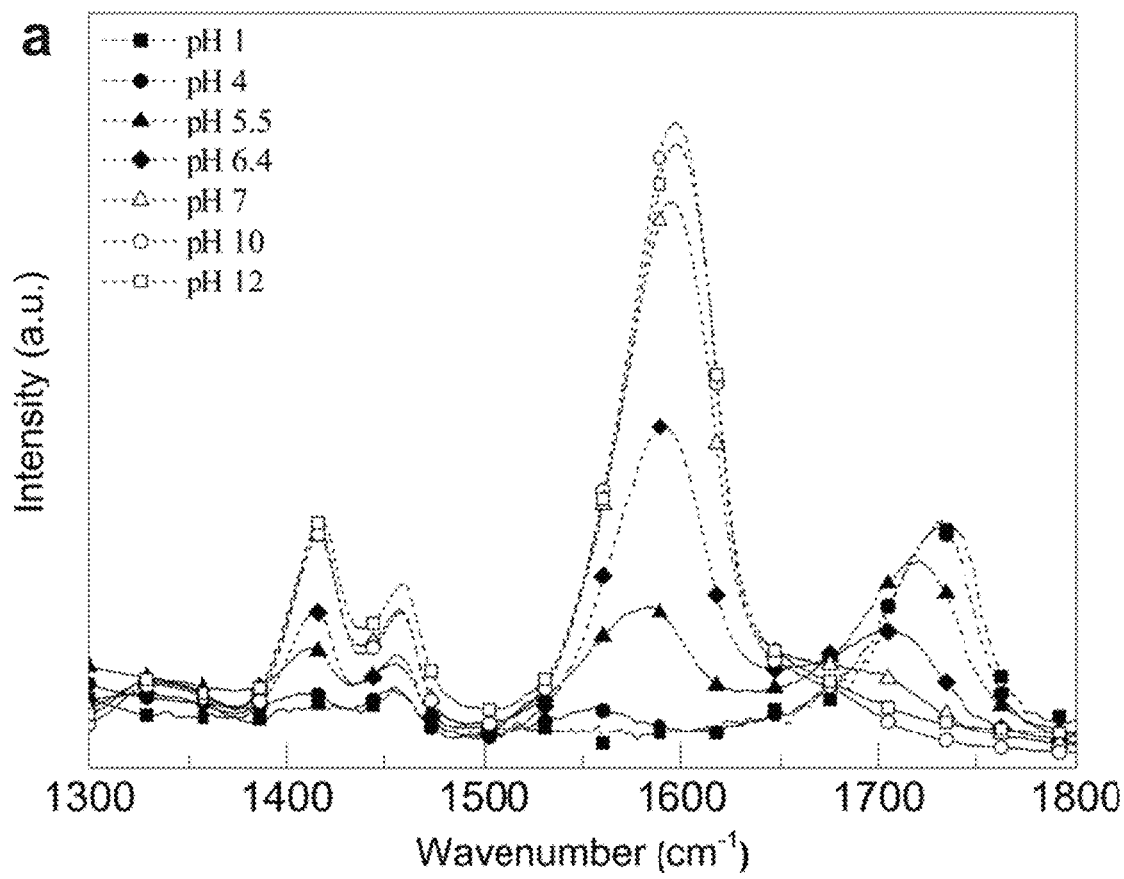
Figure 2B:
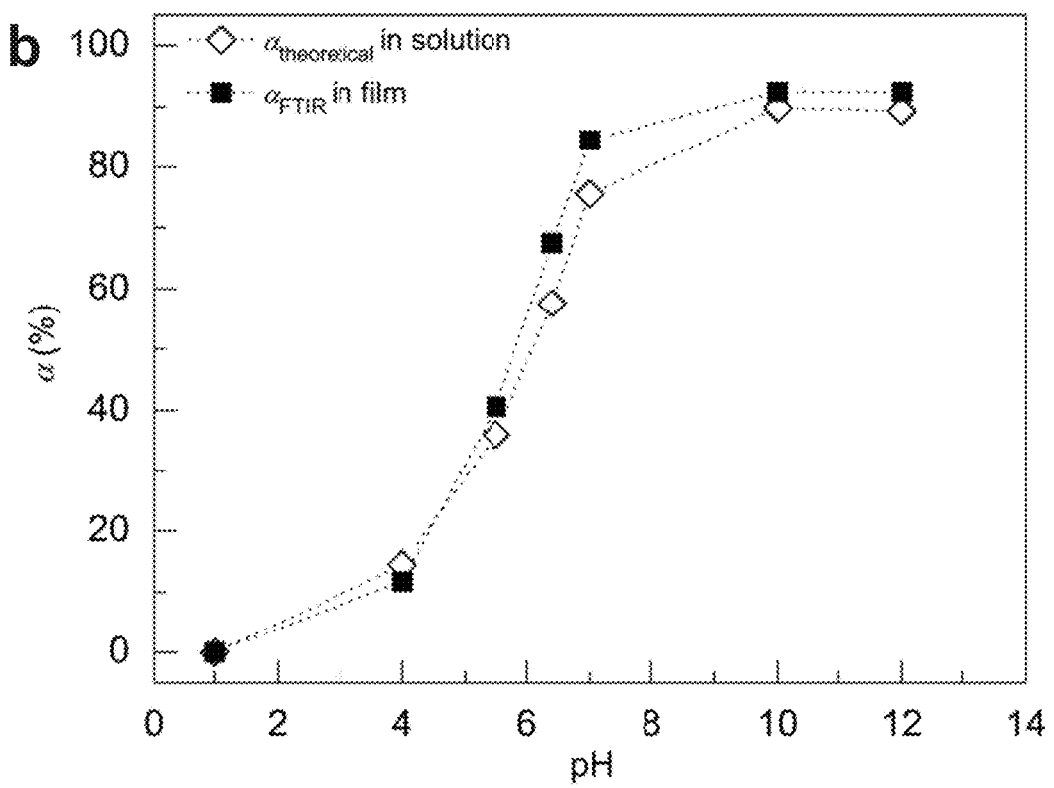
Figure 2C:
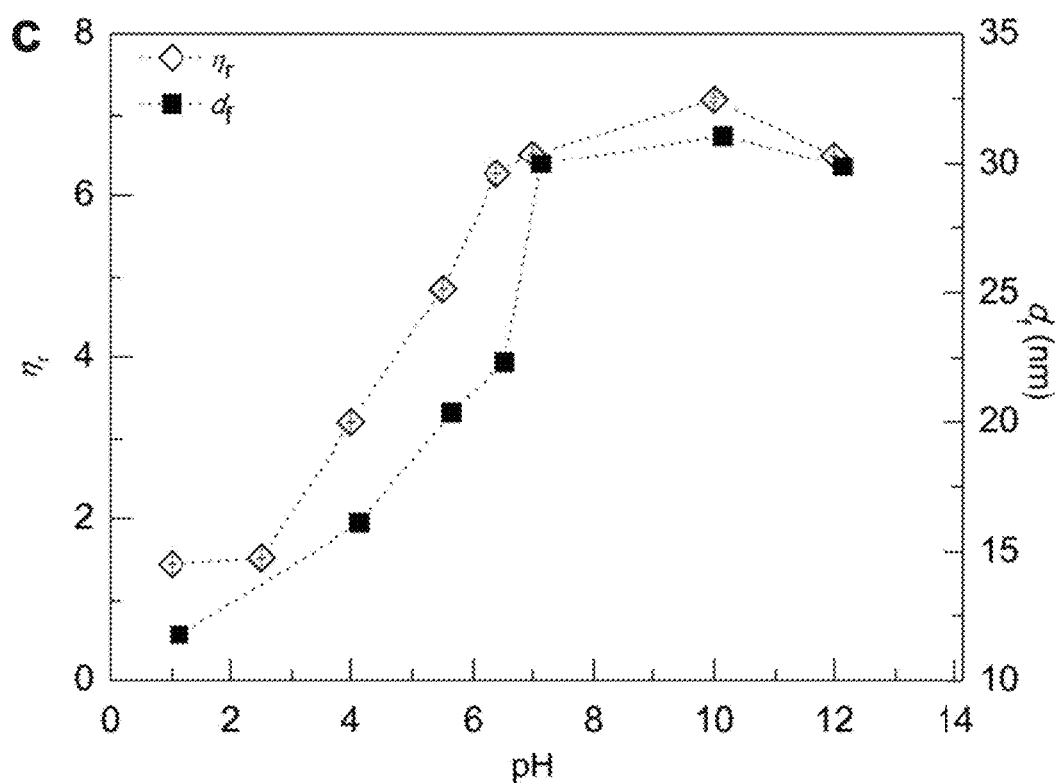
Figure 2D:
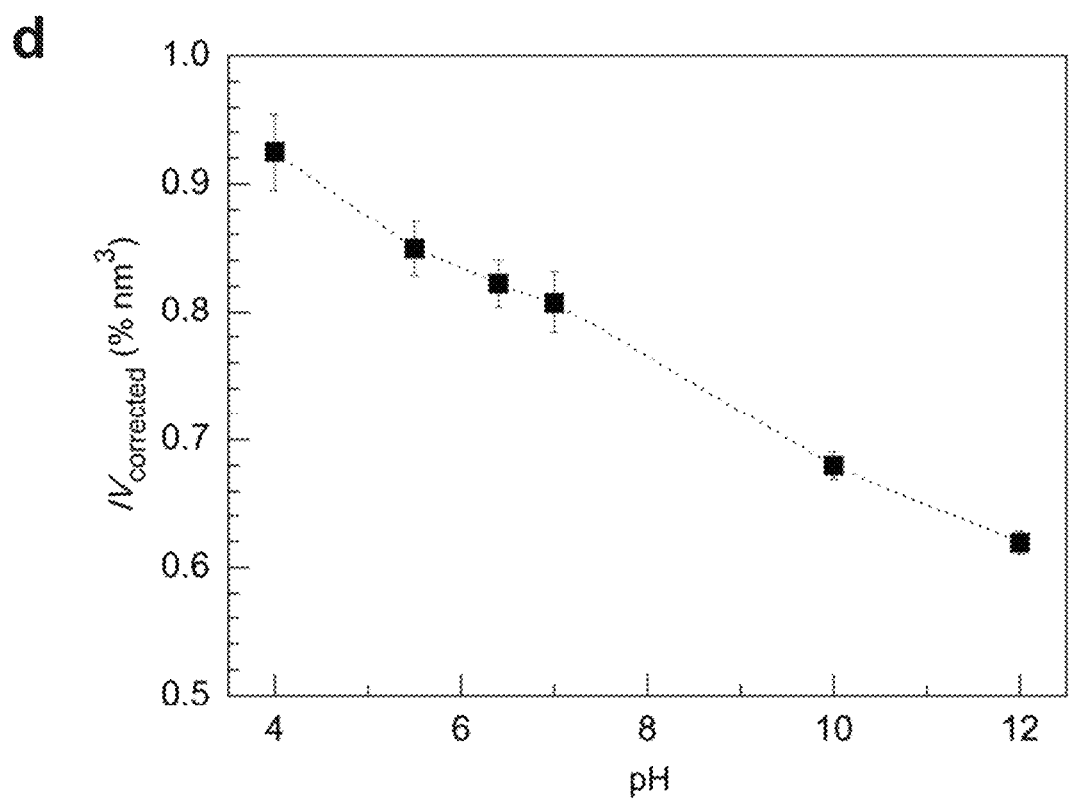
Figure 2E:
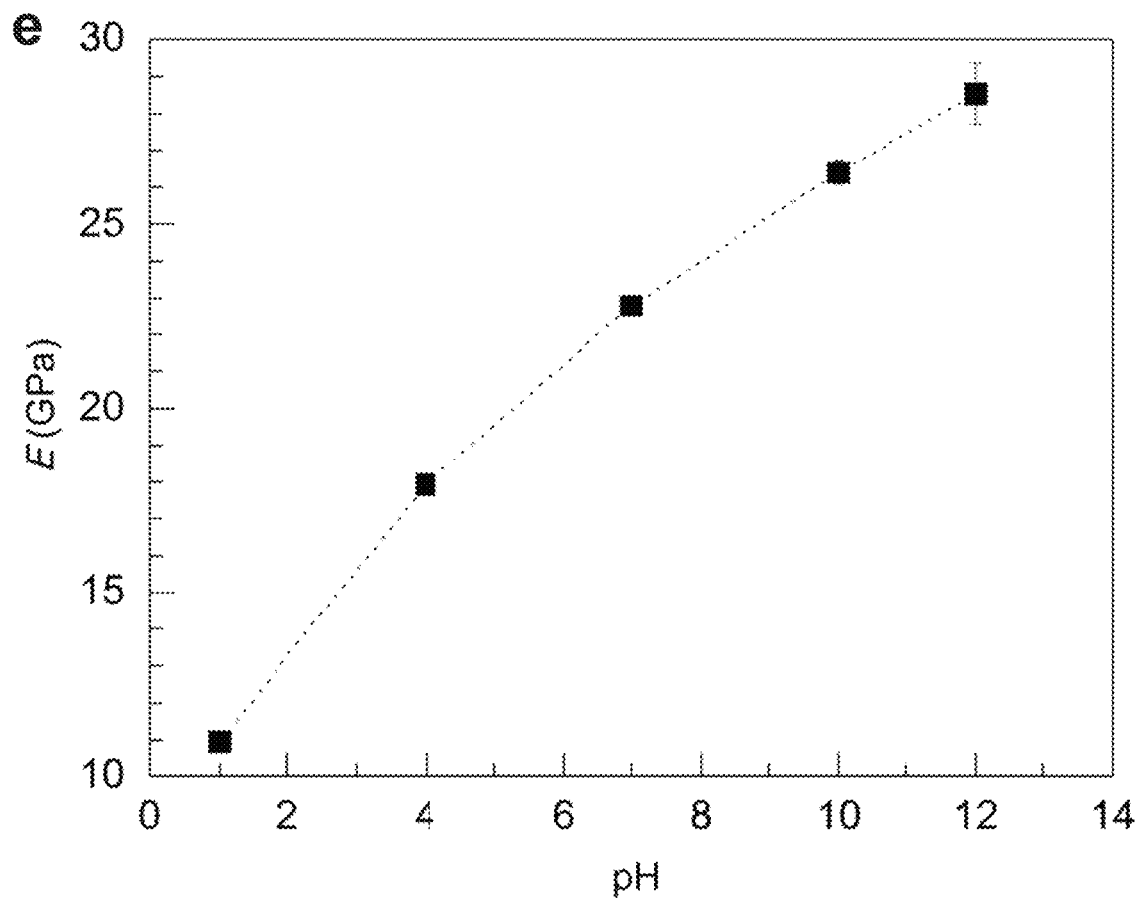
Figures 2F, 2G:
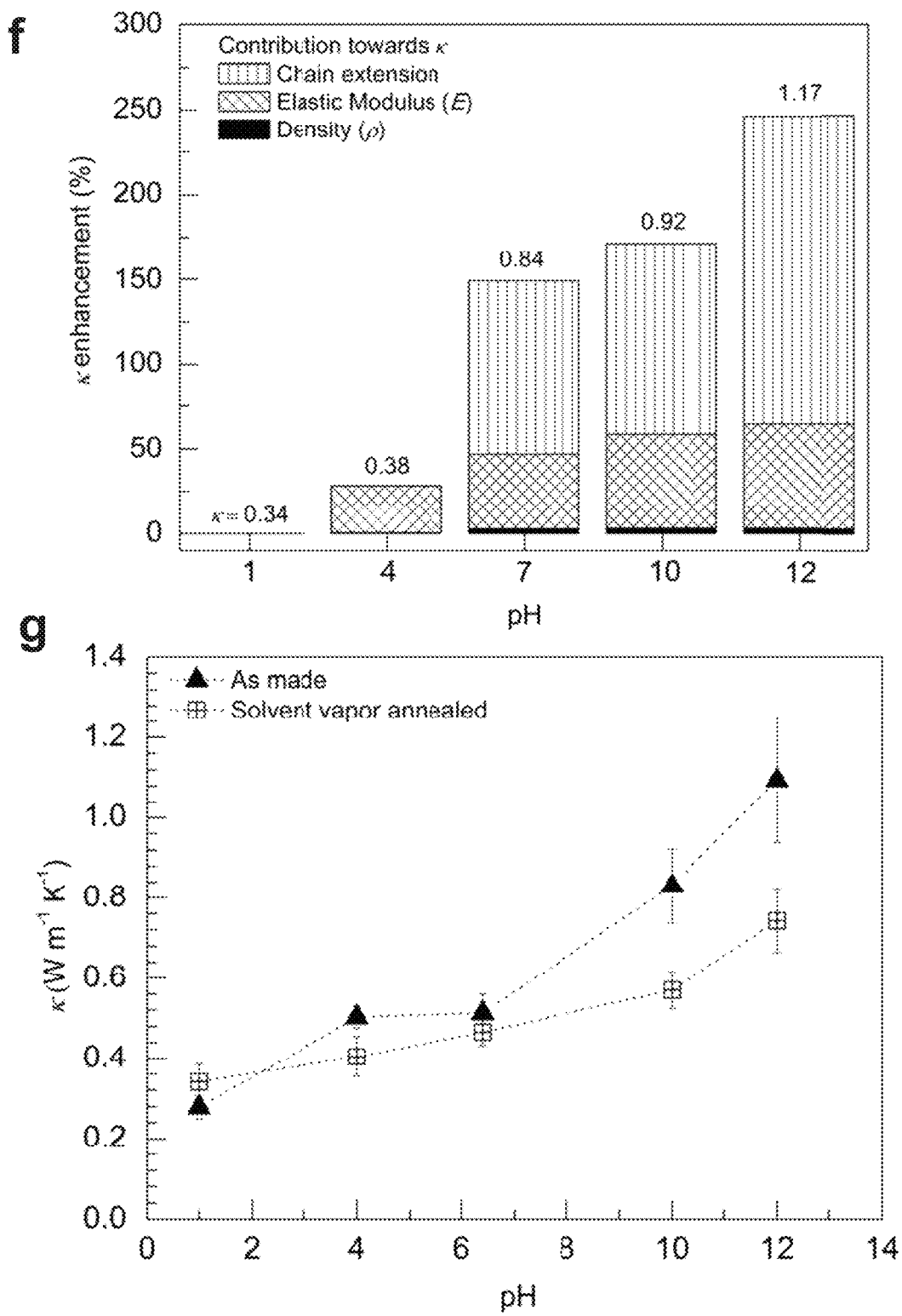
Figure 2H:
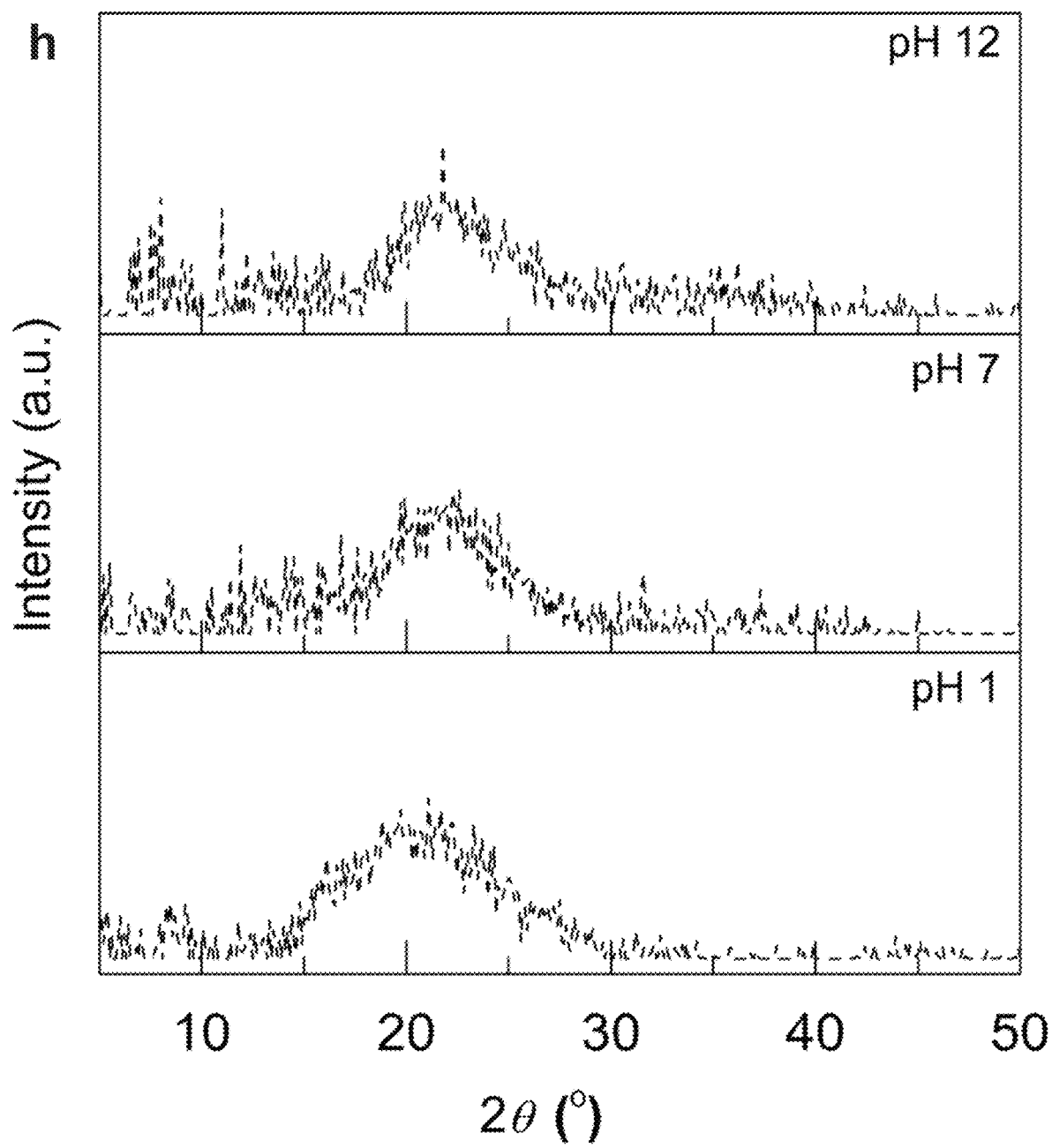

FIGS. 2A-2H show characterizations of PAA solutions and films. FIG. 2A shows Fourier transform infrared (FTIR) spectra of PAA films spin-cast from solutions having different pH values. The carboxylic acid (—COOH) carbonyl stretching band (1680-1730 $cm^{-1}$) decreases and the asymmetric carboxylate (—COO$^-$) stretching band (1556-1594 $cm^{-1}$) increases with pH. FIG. 2B shows a fraction of ionized carboxylic acid groups ($\alpha$) as a function of solution pH: calculated from the areal ratio of Gaussian fits to the FTIR spectra (square) and calculated by applying charge balance on PAA solutions (diamond). The close match between experimental (thin films) and theoretical (solutions) values suggests that PAA retains its ionization in the film state upon spin-casting. FIG. 2C shows relative viscosity, $\eta_r$ ($=\eta_{polymer}/\eta_{water}$, $\eta_{water}=10^{-3}$ Pa·s; diamond), of a 2 wt. % solution of PAA, and film thickness, $d_f$ (square), of spin-cast samples (from 0.5 wt. % solution) as a function of pH. Ionization of PAA chains causes them to be extended, resulting in an increase in the solution viscosity as well as thickness for films deposited under identical spin-cast conditions. FIG. 2D shows positronium annihilation lifetime spectroscopy data for PAA films at different pH values. The change in the product of positronium (Ps) intensity (I, %) and pore volume (V, in $nm^3$) represents the change in film porosity. The data is corrected for positron transmission through the thin films. Error bars are estimated based on the errors from fitting I and V plus an estimate of the error in the positron transmission correction. FIG. 2E shows an elastic modulus (GPa) of blade-coated PAA (MW 450 kDa) films measured by nano-indentation versus pH. The error bar shows standard deviation of measurements at four different points on the film. FIG. 2F shows contributions from three ionization-induced effects towards enhancement in thermal conductivity of spin-cast PAA films. Thermal conductivity ($\kappa$) at different pH is noted above the bars. FIG. 2G shows thermal conductivities (W/m·K) of solvent vapor-annealed PAA films (squares) compared to those of as-made samples (triangles) versus 2θ(°). PAA films are solvent-vapor annealed at 90° C. for 30 minutes followed by thermal annealing at 100° C. for 15 minutes. FIG. 2H shows grazing-incidence x-ray diffraction spectra of PAA films at different pH levels (intensity (a.u.) versus 2θ(°)).

Figure 3A:
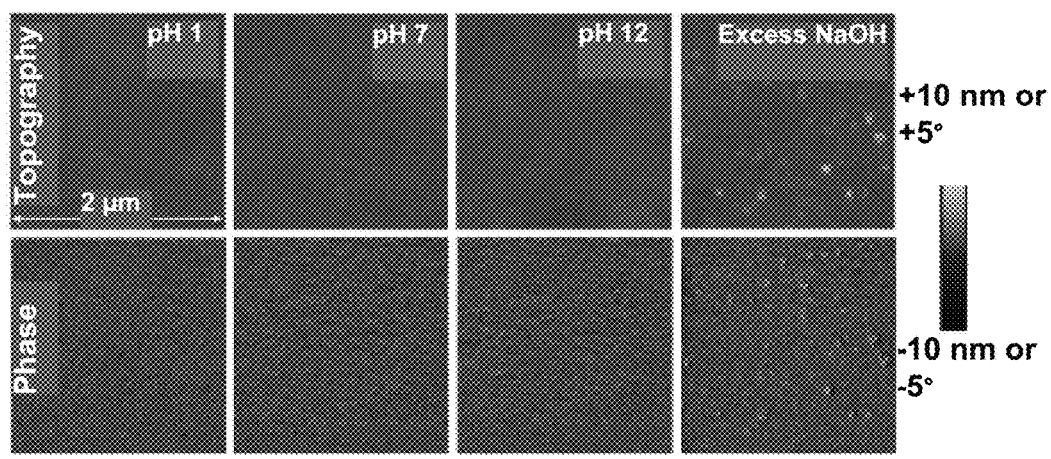
Figure 3B:
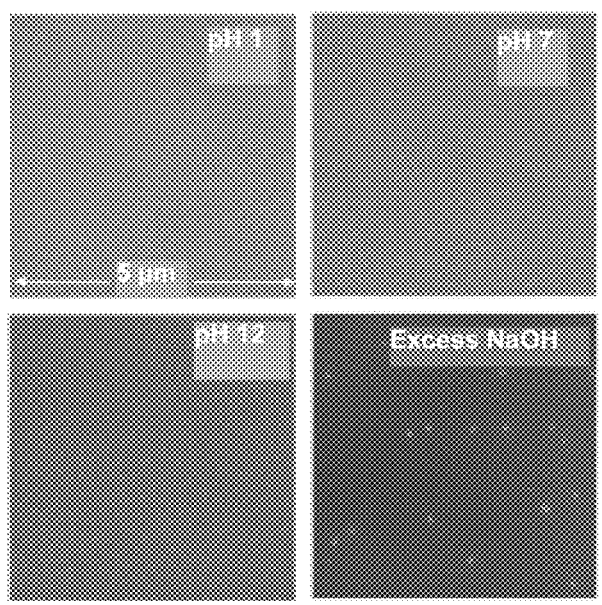
Figure 3C:
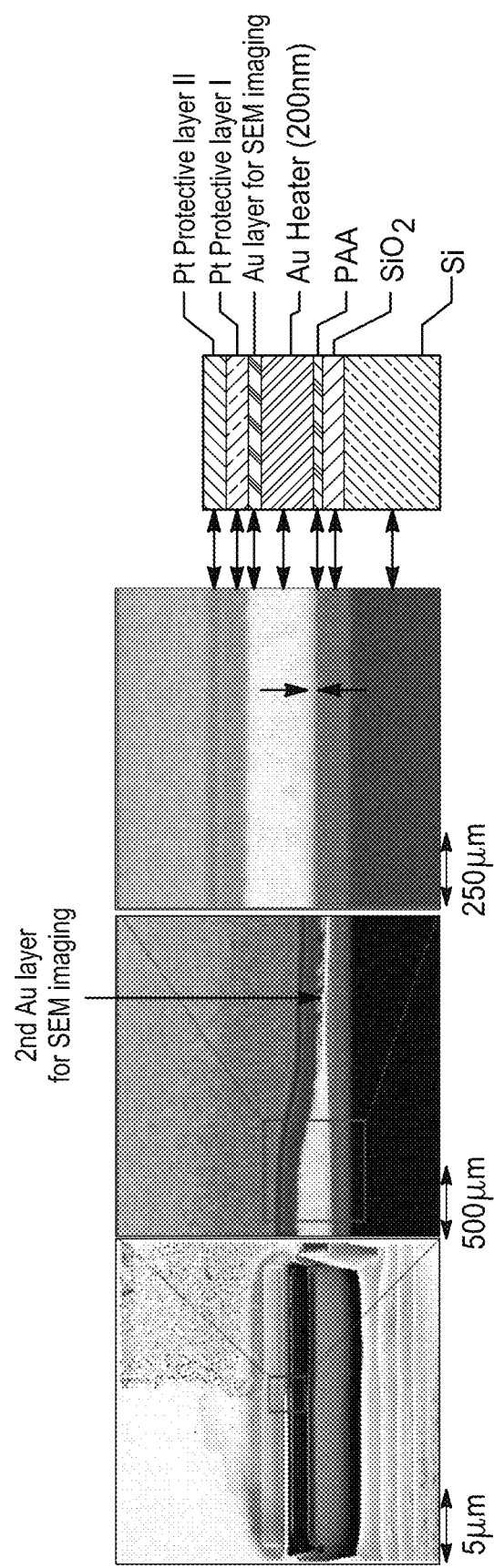
Figure 3D:
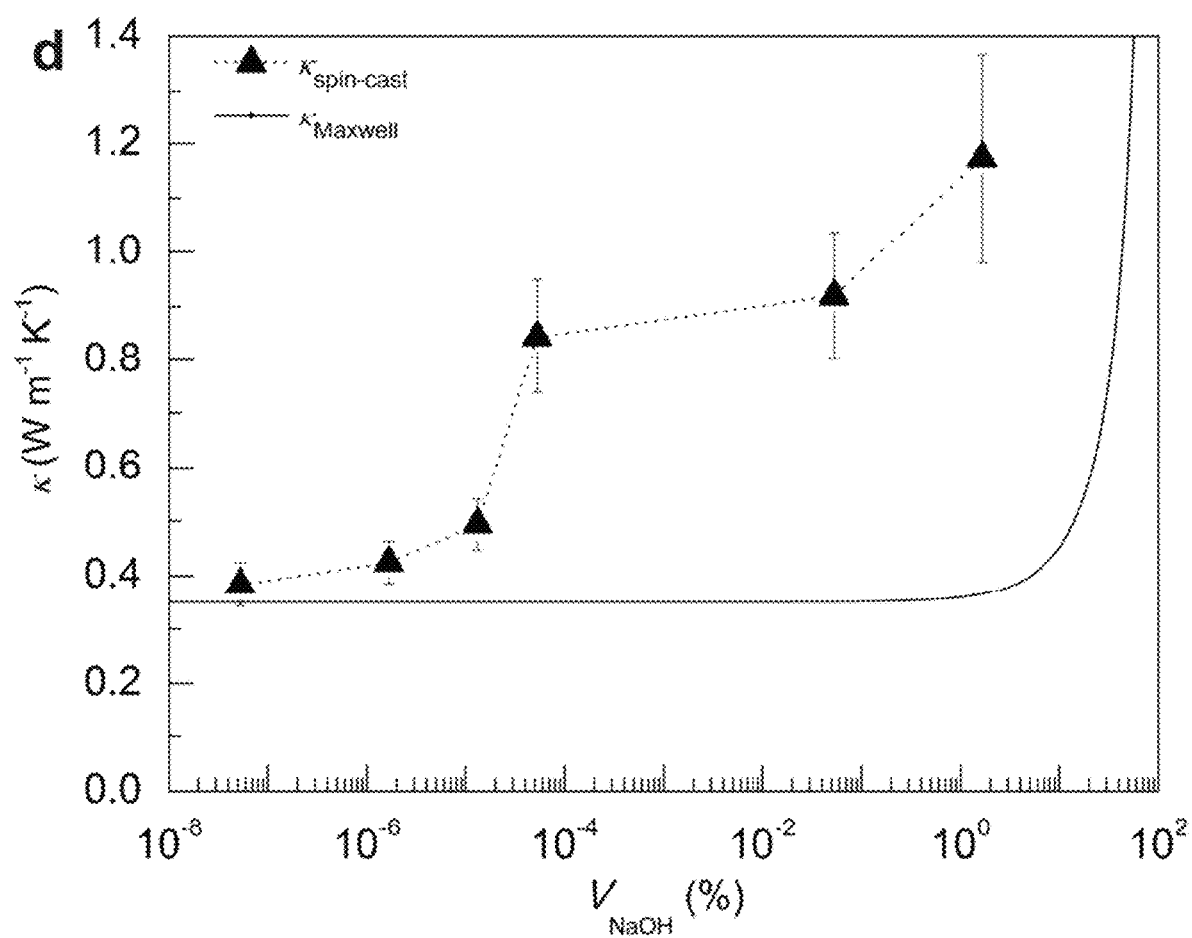

FIGS. 3A-3D show tapping-mode AFM and SEM analyses of PAA films. FIG. 3A shows a tapping-mode topography (top) and phase (bottom) images (2 μm×2 μm) of PAA films spin-cast from solutions of different pH. AFM images have been shifted to zero mean values (i.e., "flattened") for illustration purposes. Nano-sized NaOH crystals are only visible in sample with excess amount of NaOH added to the PAA solution. FIG. 3B shows SEM images of the same films analyzed by AFM. NaOH crystals can be seen only when excess NaOH is added, consistent with the AFM data. FIG. 3C shows a cross-sectional view of a pH 10 PAA film under gold (Au) heater lines. Focused ion beam (FIB) is used to etch a 20 μm long and 10 μm deep indentation on a heater line, exposing a sharp cross-section centered at its edge (left panel). Polymer film, Au heater line, deposited Au layer for SEM imaging and protective Pt layers can be seen in the cross-sectional view (center panel). Small grains (about 10 nm) within the Pt layer are clearly visible, indicating a SEM resolution that is sufficient to characterize features on this length scale. A magnified image of the sample cross-section does not show any embedded NaOH crystals in the film (marked by arrows) beneath the Au heater lines (right panel). FIG. 3D compares measured thermal conductivities, $\kappa_{spin-cast}$, for spin-cast films versus the Maxwell-model predicted values, where spin-cast films greatly exceed the Maxwell-model predicted values, indicating enhancement is not primarily due to a high-κ filler effect.

Figures 4A, 4B:
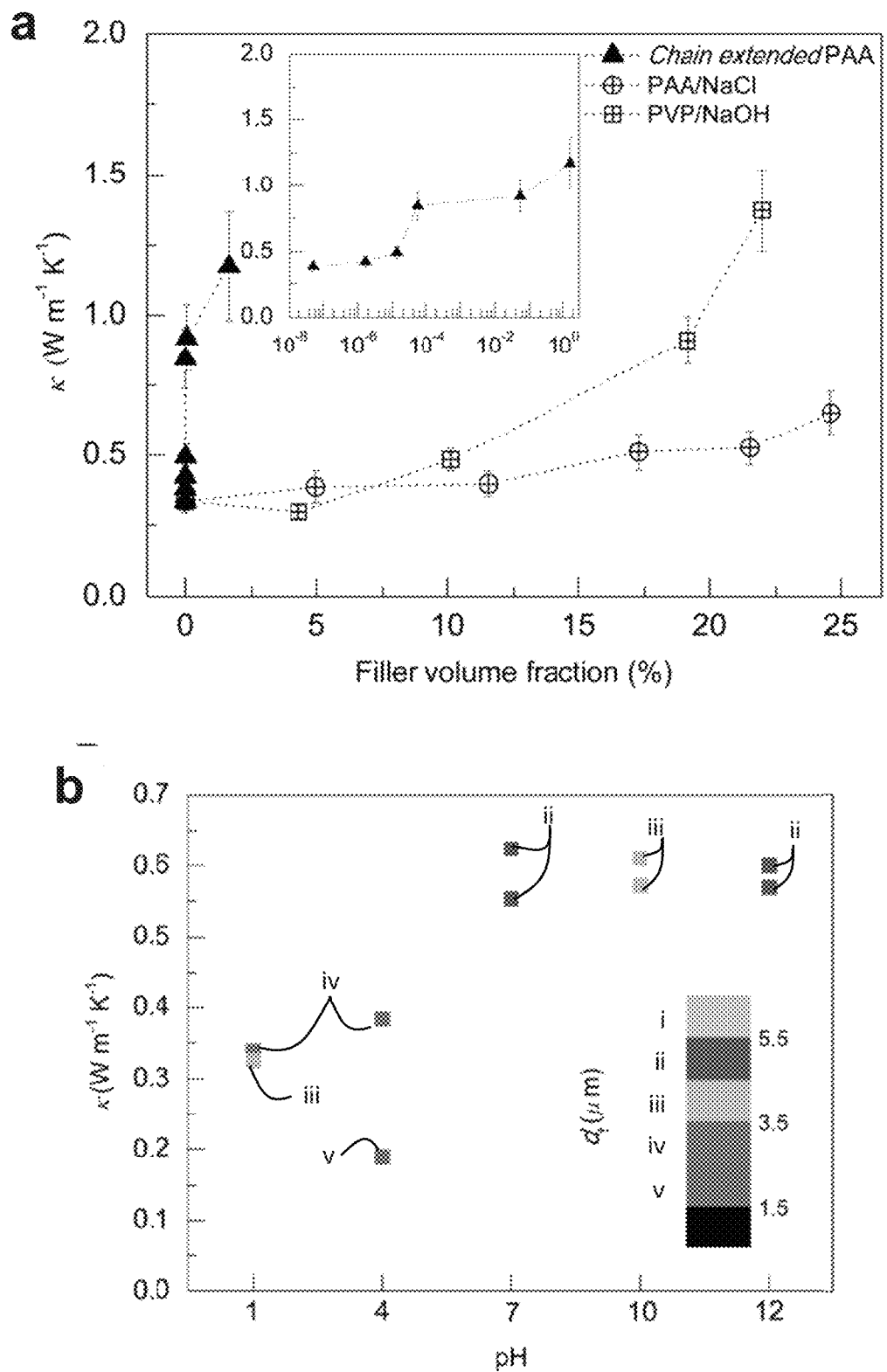

FIGS. 4A-4B. FIG. 4A shows a comparison of thermal conductivities (W/m·K) of chain extended PAA films (PAA films spin-cast from solutions at different pH) and polymer-salt composites (thin films of water soluble polymers with added inorganic salts—samples of PAA/NaCl and PVP/NaOH). Salts added in the PAA/NaCl and PVP/NaOH samples do not react with respective polymers and act as high-κ fillers. The inset shows data for chain-extended PAA with abscissa on log scale. FIG. 4B shows thermal conductivity (W/m·K) of thick PAA films blade-coated from solutions at different pH. Film thickness is shown in micrometers ranging from 1.5 to about less than 6 μm. The error in κ was less than 4% for all samples and has not been shown. The polymer solution concentration for pH 1 samples is 8 wt. % and that for pH 4-12 samples is 2 wt. %. The average thermal conductivity measured for high pH samples (pH 7-12) is about 0.59 W/m·K, which is about 80% enhancement over the average κ (~0.33 W/m·K) measured for the pH 1 samples.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of" the alternative embodiment excludes any additional compositions, materials, components, elements, features, integers, operations, and/or process steps, while in the case of "consisting essentially of" any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

As used herein, the terms "composition" and "material" are used interchangeably to refer broadly to a substance containing at least the preferred chemical constituents, elements, or compounds, but which may also comprise additional elements, compounds, or substances, including trace amounts of impurities, unless otherwise indicated.

Example embodiments will now be described more fully with reference to the accompanying drawings.

The present disclosure pertains to molecularly engineered high thermal conductivity polymers formed from polyelectrolytes. A polyelectrolyte is a polymeric macromolecule in which a substantial portion of the constitutional units (e.g., monomers) contain ionizable and/or ionic pendant groups. In this manner, the polyelectrolyte has a repeating charged pendant group, meaning that multiple charged pendant groups are repeated or distributed along the backbone of the polymer. Notably, in preferred aspects, such pendant groups may be the same group. In alternative aspects, more than one type of distinct pendant group may be repeated/distributed along the polymer backbone.

In certain aspects of the present disclosure, a high thermal conductivity polymer film is created by ionizing pendant groups in a controlled manner to form closely-packed charged groups to promote polymer chain extension in the aqueous state, followed by a film formation process, such as spin-casting or doctor-blading. The polyelectrolyte may be a polyanion or a polymer that contains a repeating pendant group that is negatively charged upon ionization. In other aspects, the polyelectrolyte may be a polycation or a polymer that contains a repeating positively charged pendant group along the polymeric backbone. Generally, the polyelectrolyte polymer becomes a polycation or polyanion after the pendant groups are ionized. Prior to ionization, the polymer is generally referred to as a polyacid that becomes a polyanion or a polybase that becomes a polycation. These terms are used interchangeably herein, with the understanding that the pendant groups on the polymer may not yet be ionized, for example, may be a polyacid capable of forming a polyanion even though they may be referred to as being a polyanion.

In certain aspects, polymers that include weak or strong acid groups, such as carboxylate, sulfate, sulfonate, phosphate, and/or phosphonate are suitable polymers as polyelectrolytes. In certain aspects, the polyelectrolyte polymer may be a weak polyelectrolyte, for example, having an acidic disassociation constant (pKa) ranging from about 2 to about 10. In certain variations, a weak polyelectrolyte provides readily controllable ionization degree and is preferred for providing tunable thermal conductivity, as opposed to a strong polyelectrolyte for which full ionization occurs even without addition of a base or acid.

By way of non-limiting example, examples of suitable polyelectrolytes include polyanions, such as carboxylic acid-containing polymers and co-polymers, like acrylic or methacrylic acid based polymers, such as poly(acrylic acid) (PAA), acrylic acid-acrylate copolymers, acrylic acid-acrylamide copolymers, like poly(acrylamide acrylic acid) (PAAm) and poly(acrylamide-co-acrylic acid) ((PAAm-co-AA)—also referred to as PAAm-AA), acrylamide-sulfonic acid copolymers (2-acrylamido-2-methyl-1-propane sulfonic acid (APSA)), acrylic acid-olefin copolymers, acrylic acid-vinyl aromatic copolymers, acrylic acid-styrene sulfonic acid copolymers, acrylic acid-vinyl ether copolymers, acrylic acid vinyl acetate copolymers, acrylic acid-vinyl alcohol copolymers, polymers of methacrylic acid (e.g., polymethyl methacrylates (PMMA)) or copolymers of methacrylic acid with any of the above monomers, copolymers of maleic acid, fumaric acid and their esters with all of the above monomers/co-monomers, copolymers of maleic anhydride with all of the above monomers/co-monomers, sulfonic acid based co-polymers, such as poly(vinyl sulfonic acid) (PVS) or sodium polystyrene sulfonate (PSS), and the like.

Other polymers well-suited for use as polyelectrolytes in accordance with the present teachings include polycations, for example, those having ammonium groups, such as quaternary ammonium groups or amine groups. One example of such a polyelectrolyte includes polyethylene imine (PEI).

In certain alternate aspects, suitable polyelectrolytes may include natural or synthetic polypeptides, which include chains of peptides (amino acids linked via peptide bonds) that may include without limitation charged amino acid groups, such as arginine, asparagine, aspartic acid, glutamic acid, glutamine, histidine, lysine, serine, threonine, and/or tyrosine, and the like. In yet other aspects, blends and mixtures of any of the above mentioned polymers may be used.

Particularly suitable polyelectrolyte polymers include those selected from the group consisting of: polyacrylic acid (PAA), poly(acrylamide acrylic acid (PAAm), poly(acryl amide-co-acrylic acid) (PAAm-AA), copolymers, and combinations thereof.

In accordance with certain aspects of the present disclosure, a chain conformation of a polymer can be systematically extended by employing coulombic repulsion along its polymer backbone via a controlled ionization process of its ionizable groups to significantly enhance thermal conductivity. For example, where the polymer is polyacrylic acid (PAA), ionization of the carboxylic acid groups serves to charge pendant groups and isotropically extend the polymer to enhance thermal conductivity. Cross-plane thermal conductivity in spin-cast amorphous films steadily grows with degree of ionization, capable of reaching in excess of about 1 W/m·K, which is similar to cross-plane thermal conductivity of glass and approximately six times higher than that of most amorphous polymers. In this manner, the present disclosure provides a new molecular engineering strategy to achieve high thermal conductivity in amorphous bulk polymers.

In one aspect, the present disclosure contemplates a method of increasing thermal conductivity of a bulk polymer. By bulk polymer, it is meant that the polymer has an unorganized and non-aligned chain conformation and exhibits a relatively low thermal conductivity. A low thermal conductivity may be, for example, less than or equal to about 0.5 W/m·K. The chains in the polymer may be coiled and/or entangled with one another. Further, the bulk polymer may be considered to be an amorphous or non-crystalline polymer. The bulk polymer comprises at least one polyelectrolyte polymer like those described above.

The method includes contacting the bulk polyelectrolyte polymer comprising an ionizable pendant group with an aqueous liquid having a pH to ionize the pendant group. As the functional or pendant groups are ionized, the polymer chain isotropically extends the polyelectrolyte polymer to an extended non-globular chain conformation. For example, as shown in FIG. 1B, a bulk polyelectrolyte polymer 50 includes a plurality of distinct polymeric chains 52 that are coiled and entangled with one another. The plurality of distinct polymer chains 52 are coiled and unionized, exhibiting bends and kinks. There is poor chain packing with voids and entanglements between the distinct polymer chains 52. After contact with an aqueous liquid having an appropriate pH, ionizable pendant groups on the polyelectrolyte chains 52 are ionized in a controlled manner and form charged species 54 bound to each polymer chain. As shown, the ionized charged species 54 are negatively charged. In this manner, each chain 52 in the bulk polyelectrolyte polymer 50 extends and swells isotropically in multiple directions (in various directions, including x and y directions) based on repulsion between like charges from the ionized charged species 54 to form an extended non-globular chain conformation 60. Each chain 52 is thus extended and stiffened, exhibiting compact chain packing with ionic bonding, van der Waals interaction and hydrogen bonding between distinct polymer chains 52 in the bulk polyelectrolyte polymer 50.

It should be noted that chains of certain polyelectrolytes like polyallyl hydride (PAH) may form globular conformations upon being ionized/charged, for example, forming globular or pearls-on-string shapes. Such polyelectrolytes are not contemplated as being suitable candidates for forming the high thermal conductivity materials according to the present disclosure.

In certain variations, the contacting further comprises combining the bulk polyelectrolyte polymer with the aqueous liquid and at least one acid or base to form an admixture. Thus, the pH of the solution may be adjusted to be more basic by adding a base to an aqueous solution or alternatively may be adjusted to be more acidic by adding an acid to the aqueous solution. pH buffers and other additives may also be added to the aqueous liquid.

Suitable non-limiting acids include hydrochloric acid (HCl), sulfuric acid ($H_2SO_4$), nitric acid ($HNO_3$), boric acid ($H_3BO_3$), phosphoric acid ($H_3PO_4$), acetic acid ($HC_2H_3O_2$), citric acid ($H_3C_6H_5O_7$), combinations and equivalents thereof.

Suitable non-limiting bases include sodium hydroxide (NaOH), potassium hydroxide (KOH), ammonium hydroxide ($NH_4OH$), and combinations and equivalents thereof. Generally, single cation bases are employed, because multi-charged cations can form ionic linkages with the polyelectrolyte, like PAA, which can cause the complex to undesirably precipitate out of water.

The pH may be adjusted to be more basic when the polyelectrolyte is a polyanion. In certain aspects, a pH of the basic solution may be greater than about 7, optionally greater than or equal to about 8, optionally greater than or equal to about 9, optionally greater than or equal to about 10, optionally greater than or equal to about 11, optionally greater than or equal to about 12, and in certain variations, optionally greater than or equal to about 13. In certain aspects, the pH of the basic solution is greater than or equal to about 12. Likewise, where the polyelectrolyte is polycationic, the pH of the solution is adjusted to be more acidic by adding an acid to an aqueous solution. In certain aspects, a pH of the basic solution may be less than about 7, optionally less than or equal to about 6, optionally less than or equal to about 5, optionally less than or equal to about 4, optionally less than or equal to about 3, optionally less than or equal to about 2, and in certain variations, optionally less than or equal to about 1.

The bulk electrolyte polymer may be present at greater than or equal to about 0.5% by weight to less than or equal to about 2% by weight in the aqueous liquid, in certain variations, at greater than or equal to about 0.5% by weight to less than or equal to about 1% by weight of the aqueous liquid.

In certain variations, the polyelectrolyte polymer is a polyacid that is capable of forming a polyanion and at least one base is added to the aqueous liquid to increase pH to greater than or equal to about 9, and in certain aspects, optionally to a pH of greater than or equal to about 12.

In other variations, the bulk polyelectrolyte polymer is a polybase that is capable of forming a polycation and at least one acid is added to the aqueous liquid to reduce pH to less than or equal to about 5.

In certain aspects, the bulk polyelectrolyte polymer comprises polyacrylic acid (PAA).

In certain other aspects, the polyelectrolyte polymer treated in accordance with the techniques of the present disclosure has the extended non-globular chain conformation 60 and exhibits a thermal conductivity of greater than or equal to about 0.6 W/m·K, optionally greater than or equal to about 0.7 W/m·K, optionally greater than or equal to about 0.8 W/m·K, optionally greater than or equal to about 0.9 W/m·K, optionally greater than or equal to about 1 W/m·K, optionally greater than or equal to about 1.1 W/m·K. In certain variations, the thermal conductivity may be greater than or equal to about 0.6 W/m·K to less than or equal to about 2 W/m·K, optionally greater than or equal to about 0.7 W/m·K to less than or equal to about 2 W/m·K, optionally greater than or equal to about 0.8 W/m·K to less than or equal to about 2 W/m·K, optionally greater than or equal to about 0.9 W/m·K to less than or equal to about 2 W/m·K, and optionally greater than or equal to about 1 W/m·K to less than or equal to about 2 W/m·K. The thermal conductivity may vary based on the thickness of the film or layer and the deposition technique. In one variation, a thermal conductivity for a layer having a thickness of greater than about 1 µm, optionally greater than or equal to about 1.5 µm to less than or equal to about 10 µm, or optionally a thickness of greater than or equal to about 1.5 µm to less than or equal to about 6 µm may be greater than or equal to about 0.6 W/m·K to less than or equal to about 1 W/m·K. Such a layer may be formed by a blade coating technique, by way of example. In another variation, a thermal conductivity for a layer having a thickness of greater than about 10 nm, optionally greater than or equal to about 10 nm to less than or equal to about 50 nm, or optionally a thickness of greater than or equal to about 10 nm to less than or equal to about 35 nm may be greater than or equal to about 0.9 W/m·K, optionally greater than or equal to about 1 W/m·K, optionally greater than or equal to about 1.1 W/m·K, and in certain variations, from greater than or equal to about 0.9 W/m·K to less than or equal to about greater than or equal to about 2 W/m·K. Such a layer may be formed by a spin coating technique, by way of example.

In certain other aspects, the contacting with the aqueous liquid having the pH increases a thermal conductivity of the polyelectrolyte polymer by greater than or equal to about 80% than an initial thermal conductivity prior to the contacting (% increase=$(\kappa_{final}-\kappa_{initial}/\kappa_{initial}) \times 100$), optionally greater than or equal to about 90%, optionally greater than or equal to about 100%, optionally greater than or equal to about 125%, optionally greater than or equal to about 150%, optionally greater than or equal to about 175%, optionally greater than or equal to about 200%, optionally greater than or equal to about 225%, optionally greater than or equal to about 240%, and in certain variations, optionally greater than or equal to about 244% increase in thermal conductivity. Notably, the increase in thermal conductivity may be greatest for thin films, while thicker films may have relatively less enhancement in thermal conductivity. Thus, in one non-limiting example, wherein an initial thermal conductivity of the bulk polyelectrolyte comprises PAA (for a thin film having a thickness of less than about 35 nm) is 0.34±0.04 W/m·K, after controlled treatment according to certain aspects of the present disclosure, the thermal conductivity is greater than or equal to about 1.17±0.19 W/m·K, so that there is an increase of thermal conductivity of about 244%.

In other aspects, the contacting with the aqueous liquid having the desired pH occurs until a relative viscosity ($\eta_r=\eta_{Polymer}/\eta_{water}$) of the bulk polyelectrolyte polymer ($\eta_{polymer}$) to water ($\eta_{water}=10^{-3}$ Pa·s) measured at 25° C., increases with solution pH, indicating that coulombic repulsion between ionized carboxylic acid groups stretches out the PAA chains, resulting in an extended morphology. Thus, a relative viscosity is related to a desired degree of ionization that occurs on the polyelectrolyte during the methods of the present disclosure. In certain aspects, a relative viscosity ($\eta_r$) is greater than or equal to about 6.5. The degree of ionization in a solid film may also be characterized directly with FTIR (e.g., the spectra is shown in FIG. 2A), and the degree of ionization is measured by fitting the spectra with Gaussian peaks, for which the result is shown in FIG. 2B.

In certain variations, the present disclosure contemplates spin casting the admixture comprising the aqueous liquid and the bulk polyelectrolyte polymer that has been ionized onto a substrate to form a solid film of the polyelectrolyte polymer having the extended non-globular chain conformation. Various substrates may include polymers, metals, semiconductors, such as silicon wafers, glass, and the like. In one example, the spin-casting may be conducted at greater than or equal to about 1,500 r.p.m. for about 30 seconds. The spin casting may cause the aqueous liquid to evaporate and the film may be dried. Such a solid material has a thermal conductivity of greater than or equal to about 0.6 W/m·K, more particularly, greater than or equal to about 1 W/m·K, or any of the ranges described above. In certain aspects, the film may have a thickness of greater than or equal to about 10 nm to less than or equal to about 35 nm. The resulting films may be annealed at 100° C. for about 1 hour. The spin-casting and annealing steps may be done in an inert atmosphere, such as a nitrogen atmosphere. In certain variations, the method may be done on a continuous basis, such as in a roll-to-roll process (R2R).

In certain other variations, the present disclosure contemplates blade coating the admixture comprising the aqueous liquid and the bulk polyelectrolyte polymer that has been ionized onto a substrate to form a solid film of the polyelectrolyte polymer having the extended non-globular chain conformation. Any of the substrates mentioned above may be used. The blade may be a doctor blade. The blade coating may apply the material, after which, the aqueous liquid evaporates and the film may be dried. Such a solid material has a thermal conductivity of greater than or equal to about 0.6 W/m·K or any of the ranges described above. In certain aspects, the film may have a thickness of greater than or equal to about 1.5 µm to less than or equal to about 6 µm. The resulting solid film may be annealed at 100° C. for about 1 hour. Like the spin casting, the blade-coating and annealing steps may be done in an inert atmosphere, such as a nitrogen atmosphere. In certain variations, the method may be done on a continuous basis, such as in a roll-to-roll process (R2R).

The present disclosure also contemplates high thermal conductivity material comprising a bulk polyelectrolyte polymer bearing an ionized/charged pendant group. The bulk polyelectrolyte polymer has an extended non-globular chain conformation, which exhibits a thermal conductivity of greater than or equal to about 0.6 W/m·K, optionally greater than or equal to about 1 W/m·K. In certain aspects, the high thermal conductivity material may be a solid. In certain embodiments, the high thermal conductivity material is in the form of a solid film having a thickness of greater than or equal to about 10 nm to less than or equal to about 10 µm, optionally in certain variations, greater than or equal to about 10 nm to less than or equal to about 35 nm and in other variations, optionally greater than or equal to about 1.5 µm to less than or equal to about 6 µm. Where the thickness of the high thermal conductivity material is less than or equal to about 50 nm, for example, from greater than or equal to about 10 nm to less than or equal to about 35 nm, a thermal conductivity may be greater than or equal to about 1 W/m·K. Where the thickness of the high thermal conductivity material is greater than or equal to about 1 µm, for example, from greater than or equal to about 1.5 µm to less than or equal to about 6 µm, a thermal conductivity may be greater than or equal to about 0.6 W/m·K.

In certain variations, the polyelectrolyte polymer comprises a polycation selected from the group consisting of: polyethylene imine (PEI), arginine, asparagine, aspartic acid, glutamic acid, glutamine, histidine, lysine, serine, threonine, and/or tyrosine, and combinations thereof.

In certain other variations, the polyelectrolyte polymer comprises a polyanion selected from the group consisting of: poly(acrylic acid) (PAA), acrylic acid-acrylate copolymers, acrylic acid-acrylamide copolymers, like poly(acrylamide acrylic acid) (PAAm) and poly(acrylamide-co-acrylic acid) ((PAAm-co-AA), acrylamide-sulfonic acid copolymers (2-acrylamido-2-methyl-1-propane sulfonic acid (APSA)), acrylic acid-olefin copolymers, acrylic acid-vinyl aromatic copolymers, acrylic acid-styrene sulfonic acid copolymers, acrylic acid-vinyl ether copolymers, acrylic acid vinyl acetate copolymers, acrylic acid-vinyl alcohol copolymers, polymers of methacrylic acid, polymethyl methacrylates (PMMA), copolymers of methacrylic acid with any of the above monomers, copolymers of maleic acid, fumaric acid and their esters with all of the above monomers/co-monomers, copolymers of maleic anhydride with all of the above monomers/co-monomers, sulfonic acid based co-polymers, such as poly(vinyl sulfonic acid) (PVS) or sodium polystyrene sulfonate (PSS).

Particularly suitable polyelectrolyte polymers include those selected from the group consisting of: polyacrylic acid (PAA), poly(acrylamide acrylic acid (PAAm), poly(acryl amide-co-acrylic acid) (PAAm-AA), copolymers, and combinations thereof.

In one aspect, the polyelectrolyte polymer comprises poly(acrylic acid) (PAA) and the ionized charged group comprises a carboxylate ion.

In certain aspects, the thermal conductivity is greater than or equal to about 1 W/m·K.

In other variations, the high thermal conductivity material may be a composite that includes a high thermal conductivity polymer and at least one reinforcement phase or material. By way of example, the high thermal conductivity material may further comprise a high thermal conductivity particle. The high thermal conductivity particle may be selected from the group consisting of: metal particles, ceramic particles, carbon nanotubes (CNTs), and graphene flakes.

The high thermal conductivity material may be used in a variety of devices. By way of non-limiting example, high thermal conductivity material can be used in various electronic devices, such as light emitting diode (LEDs), microprocessors, diode lasers, high-mobility transistors, high power density electronic devices, electronic chip encapsulation, cellphone and device casings, flexible electronics, batteries and electrochemical cells, cooling systems, like vehicle cooling systems, and the like. In certain variations, the high thermal conductivity material may be used in thermal interface materials and pads. In other variations, the high thermal conductivity material may form the housing or otherwise encapsulate a device or component.

By way of background, in contrast to low thermal conductivity ($\kappa$) in bulk samples, constituent individual polymer chains are believed to have very large $\kappa$. The thermal conductivity of a single polymer chain, in which the elastic disorder between intra-chain covalent and inter-chain van der Waals bonds is absent, has been calculated to be as large as few hundreds of W/m·K. See for example, FIG. 1A, showing a bulk polyelectrolyte polymer 20 includes a plurality of distinct polymeric chains 22 that are coiled and entangled with one another. This material has a low thermal conductivity. After mechanically stretching and aligning individual polymer chains 22, the mechanically stretched and aligned polymer chains 30 have high κ, but only in an alignment direction 32 (shown along the x-direction). Ultra-drawn crystalline nanofibers with aligned polymer chains have been shown to have κ over 100 W/m·K in the alignment direction. The large thermal conductivities of single or few-chain fibers can be retained in amorphous polymers in a direction of chain orientation, along which heat propagation occurs predominantly through intra-chain transport. These high thermal conductivities reported in polymers with extended linear chain conformation stand in contrast to bulk polymers, such as surface-grown polymer brushes and polymer films formed under high pressure, in which the coiled conformation of polymer chains remains and enhancement in κ has been found to be relatively small.

Previous chain extension occurred mainly by mechanical stretching, exotic nanofabrication techniques, or kinetic processes during spin-casting. These approaches either limit the orientation of chain extension to a certain anisotropic direction (FIG. 1A) or pose challenges in terms of scaling-up the nanoscale films for practical applications. For example, in FIG. 1A, high thermal conductivity is achieved in polymer fibers (e.g., mechanically stretched and aligned polymer chains 30) in a single alignment direction 32 that occurs through mechanical stretching and ensuing chain alignment. However, in order to achieve high κ in bulk amorphous polymers through chain extension, the extension is desirably isotropic in multiple directions through a bulk of the polymer material and not dependent on exotic fabrication processes.

In accordance with certain aspects of the present disclosure, extended chain morphologies in an amorphous state, even without any preferential orientation of polymer chains, can provide significant enhancements in thermal conductivity (as described in the context of FIG. 1B). Polyelectrolytes with ionizable pendant groups on the backbone can produce linear coulombic repulsion under certain conditions of acidity or basicity, thereby isotropically stretching the polymer chains to extended conformations. This thermodynamically driven process for chain extension can be scaled-up more easily than other techniques, such as certain polymer blend approaches for high thermal conductivity in which the miscibility between two polymers may be affected by spin-cast conditions.

In one variation, a weak polyelectrolyte, polyacrylic acid (PAA, atactic) is used, which is made up of a C—C backbone with a carboxylic acid (—COOH) group at alternate carbon atoms that can be ionized to a carboxylate (—COO) by addition of a base, in other words, with an increase of the polymer solution pH (FIG. 1C). The close proximity of the densely packed ionizable groups to the polymer main chain allows the effect of electrostatic repulsion between them to easily translate to the backbone, resulting in chain extension as more and more —COOH groups are ionized. As a negative control, a water soluble polymer, poly(A-vinyl pyrrolidone) (PVP, atactic), without any ionizable pendant groups (FIG. 1D) is employed for comparison.

To fabricate thin films for thermal conductivity measurements, the polymer is dissolved in de-ionized (DI) water, and the pH of the solution is adjusted to the desired value by addition of 1M hydrochloric acid (HCl) or 1M sodium hydroxide (NaOH) solution. Thus, the pH of the solution for the polyanionic polyelectrolyte PAA is adjusted to be more basic by adding a base to an aqueous solution to ionize the carboxylic acid group to a carboxylate. In certain aspects, a pH of the basic solution may be greater than about 7, optionally greater than or equal to about 12, and in certain variations, optionally greater than or equal to about 13. Likewise, where the polyelectrolyte is polycationic, the pH of the solution is adjusted to be more acidic by adding an acid to an aqueous solution. In certain aspects, a pH of the acidic solution may be less than about 7, optionally less than or equal to about 6, optionally less than or equal to about 5, optionally less than or equal to about 4, optionally less than or equal to about 3, optionally less than or equal to about 2, and in certain variations, optionally less than or equal to about 1.

The final polymer concentrations are 0.5 wt. % and 1 wt. % for PAA and PVP, respectively. Polymer solutions are then spin-cast on a silicon (Si) wafer with an approximate 100 nm oxide layer and annealed to obtain smooth films having thicknesses in a range of greater than or equal to about 10 to less than or equal to about 35 nm. Cross-plane thermal conductivities of the polymer films are measured by a differential 3ω method, which is a standard technique for such measurements in films with thickness as small as few nanometers.

In FIG. 1E, a cross-plane thermal conductivity of thin films of spin-cast from polymer solutions of different pH are shown, including PAA (triangle) and PVP (circle). Error bars are calculated based on uncertainties in film thickness, temperature coefficient of electrical resistance for the heater, and heater width. As shown in FIG. 1E, the thermal conductivity of PAA increases from 0.34±0.04 W/m·K at pH 1 when the completely unionized polymer chains are in a coiled up morphology to 1.17±0.19 W/m·K at pH 12 when the predominantly ionized (>90%, vide infra) polymer chains extend under coulombic repulsive forces into a swollen conformation. The thermal conductivity of PVP; however, measured about 0.2 W/m·K across the entire pH range, consistent with its non-electrolyte nature.

To confirm and quantify the extent of ionization and chain morphology for PAA, Fourier transform infrared (FTIR) spectroscopy and viscometric measurement are carried out, which are standard analytical tools to measure changes in the chemical and rheological properties of polymers, respectively. FIG. 2A shows the FTIR spectra of PAA films spin-cast from solutions of different pH. To quantify the extent of PAA ionization, two distinct stretching bands of the carboxylic acid moieties are considered. The decrease in intensity of the carbonyl (—C=O) stretching band (1680-1730 $cm^{-1}$) of the carboxylic acid (—COOH) group with pH and concomitant increase in the intensity of the asymmetric carboxylate (—COO$^-$) stretching band (1556-1594 $cm^{-1}$) indicate ionization of the PAA chains. The degree of ionization (a) of PAA as a function of solution pH (FIG. 2B), calculated from the areal ratio of peaks corresponding to ionized and unionized acidic groups fitted assuming Gaussian distributions and the same extinction coefficient for the two bands, matches with previously reported trends. A theoretical charge balance calculation for the PAA solution yielded similar values for a, confirming that PAA retains its ionization in the thin film state. Notably, the FTIR spectra for PVP at differing pH levels are nearly identical (not shown), which is consistent with PVP's non-electrolyte nature.

The viscosities of PAA solutions at different values of pH are measured to quantify polymer chain extension in the solution state. Intrinsic viscosity of a polymer ([η]) scales cubically with the root mean square radius of gyration ($<s^2>^{1/2}$) for a given polymer molecular weight (MW), and ionization induced swelling of polyelectrolyte chains manifests itself as an increase in solution viscosity. As shown in FIG. 2C, the relative viscosity, $\eta_r$ ($=\eta_{Polymer}/\eta_{water}$, $\eta_{water}=10^{-3}$ Pa·s), increases with solution pH, indicating that coulombic repulsion between ionized carboxylic acid groups stretches out the PAA chains, resulting in an extended morphology. Under the same spin-casting conditions, the trend in film thickness (df) matches well with that of solution viscosity, suggesting that the extended conformations of PAA chains in solution appear to be preserved in the thin films. In contrast, the viscosities of PVP solutions as well as the film thicknesses for spin-cast PVP samples remained unchanged across the pH range as expected.

Because chain extension can lead to better chain packing as well as chain stiffening, film porosity and elastic modulus of the PAA films are measured to quantify the density-related ($\kappa \propto \rho^{1/6}$) and modulus-related ($\kappa \propto E^{1/2}$) contributions to $\kappa$ enhancement. Film porosity data measured by positronium annihilation lifetime spectroscopy (PALS) data (FIG. 2D) shows a linear decrease in PAA film porosity with pH, which can be explained by better packing afforded by polymer chain extension in the thin film. The measured ~33% drop in film porosity from pH 4 to pH 12 is consistent with the previously measured trend of ionization-dependent bulk density for partially ionized PAA. Because it was not possible to directly calculate density from the PALS data, densities are interpolated at different degrees of ionization based on the bulk densities reported in Gidley, D. W. et al., "Positron Annihilation as a Method to Characterize Porous Materials," Annu. Rev. Mater. Res. 36, pp. 49-79 (2006), the relevant portions of which are incorporated herein by reference.

Furthermore, grazing-incidence x-ray diffraction measurements carried out on spin-cast PAA films does not show any sign of polymer crystallinity, as shown in FIG. 2H. The data rule out any crystallinity-related contribution to the measured thermal conductivity. A broad diffused peak, known as amorphous halo, can be seen for all samples, which is characteristic of amorphous polymers including PAA and PAA salts.

Factors contributing to enhanced thermal conductivity ($\kappa$) are explored herein. To deconvolute the contributions to measured $\kappa$ from the three ionization induced effects, a minimum thermal conductivity model (MTCM), which describes thermal transport in amorphous and highly disordered materials. According to this model, $\kappa$ scales with atomic densit ($\rho_{atom}$) as $\rho_{atom}^{1/6}$, which has been approximated with mass density ($\rho$) here, and linearly with sound velocity which further depends on elastic modulus as $E^{1/2}$. Because the film density cannot be directly calculated from the PALS data, densities are interpolated at different degrees of ionization based on the bulk densities. Assuming that film density scales linearly with bulk density, an approximate 20% higher bulk density at pH 12 ($\alpha=92.5\%$) compared to pH 1 ($\alpha=0\%$) suggests a relatively small (about 3%) density-related contribution to the enhanced $\kappa$. Due to the inherent difficulty of measuring modulus for nano-scale spin-cast films, nano-indentation is performed on micrometer-thick blade-coated PAA (MW 450 kDa, atactic) films prepared by a blade-coating method to measure polymer elastic modulus as a function of ionization. As shown in FIG. 2E, elastic modulus increases from about 10.96±0.07 GPa at a pH 1 to about 28.53±0.83 GPa at pH 12. As shown in FIG. 2E, the elastic modulus increases with pH, thus increasing with ionization of PAA chains. The maximum modulus-related contribution to the measured $\kappa$ was calculated to be approximately 56%. The large increase in glass transition temperature ($T_g$) of PAA with ionization has been generally attributed to a similar chain stiffening effect in which chain segmental mobility is reduced due to strong ionic interactions between the negatively charged polymer chains and the surrounding positive cationic coordination sphere. The modulus-related contribution to the measured $\kappa$ is calculated to be about 61%. Based only on density- and modulus-related contributions to $\kappa$, the thermal conductivity at pH 12 is predicted to be about 0.57 W/m·K, a 65% enhancement in $\kappa$ over that of pH 1 ($\kappa=0.34$ W/m·K) that is substantially smaller than the approximate 244% enhancement measured. Conversely, if enhancement in $\kappa$ for the spin-cast thin films are to be attributed solely to an enhancement in modulus, the elastic modulus of the pH 12 film amounts to approximately 130 GPa, which is rather unphysical for PAA. Elastic modulus measured for a blade-coated pH 1 film (10.96±0.07 GPa) matches closely with that of a spin-cast PAA film measured using picosecond acoustics (about 9.86 GPa).

FIG. 2F shows the various contributions to measured $\kappa$ for each pH calculated by taking $\kappa$ for pH 1 as the baseline. The measured value ($\kappa=0.38\pm0.04$ Wm$^{-1}$K$^{-1}$) for a pH 4 sample is lower than the MTCM-calculated value (0.43 Wm$^{-1}$K$^{-1}$), which is consistent with the miniscule ionization and therefore chain extension in spin-cast film at this pH. Clearly, the MTCM, which is based on vibrational states that are neither fully localized nor propagating (diffusons), does not entirely capture the enhancement in $\kappa$ measured in this system. Without being limited to any particular theory, it is speculated that the extended and stiffened PAA chains may result in increased diffusion lengths for diffusons. Because long-range propagating modes have been previously shown to exist in disordered solids like amorphous Si, it is also possible that a small population of "propagons" exists in the chain-extended PAA. However, further studies are necessary to understand the detailed heat transport mechanisms in these extended systems. The additional $\kappa$ enhancements shown in this study added chain extension effect in spin-cast NaOH-treated PAA thin films, which gives rise to a greater persistence length and larger effective rigidity of the polymer chains. It is likely that the predominant vibrational transfer of heat along the covalently bonded polymer backbone afforded by the extended and stiffened chain morphology, as well as enhanced interchain conductance due to stronger ionic bonds, result in the substantial increment in $\kappa$.

To further confirm the contributions of extended chain morphology of the ionized PAA chains to measured thermal conductivity, solvent vapor annealing (SVA) on spin-cast PAA films is performed. Absorption of solvent vapors during SVA increases chain mobility resulting in morphological equilibration of the polymer chains that had been kinetically frozen. As shown in FIG. 2G, the differences in thermal conductivity between "as-made" and "solvent vapor-annealed" samples are within experimental uncertainties for low pH samples, indicating that any disruption of ionic and H-bond interactions due to solvent annealing does not change $\kappa$ significantly. However, for pH 10 and 12 samples, much lower thermal conductivities are measured for solvent-annealed samples, which can be explained by the coiling up (i.e., relaxation) of PAA chains during the solvent-annealing process. At pH 12 specifically, thermal conductivity dropped by as much as about 32%. This signifies that kinetically frozen extended PAA chains are partially responsible for high thermal conductivities measured in the spin-cast films.

One may also postulate about the possible contribution of residual Na$^+$ and OH$^-$ ions in the polymer solution to the measured thermal conductivities for the films prepared at high pH, given that NaOH crystals in the spin-cast films can potentially act as high-$\kappa$: fillers. However, theoretical calculations as well as AFM and SEM analyses indicate that such contributions are minor compared to the ionization induced effects discussed above. Based on the known amount of PAA and NaOH added in the polymer solutions at various pH, the maximum possible volume fraction of NaOH crystals ($V_{NaOH}$) in the resulting polymer films is calculated. The calculated $V_{NaOH}$ is found to be negligible ($V_{NaOH}$ is about 1.65% for pH 12 sample) except for an additional sample (not shown in the data of FIG. 1E or 2) for which excess NaOH is added specifically to probe the potential contribution of NaOH crystals (shown in FIGS. 3A and 3B). While crystals are not observed in the samples except for the one with excess NaOH, a Maxwell model is nevertheless used to predict the thermal conductivities that would be expected if the maximum volume fraction of NaOH crystals for each pH is homogeneously distributed within the film as nano-size spherical fillers, for comparison with values measured for chain-extended PAA films. A volumetric percolation threshold equal to 25% is required for appreciable κ enhancement in such composites; this is not reached even for the highest pH PAA film (pH 12; $V_{NaOH}$=1.65%). The fact that measured PAA thermal conductivities are significantly greater than Maxwell-predicted values (FIG. 3D, showing a percolation threshold of 25%) indicates that κ enhancement due to ionization-induced chain extension dominates over the possible contributions of high-κ fillers over the range of pH selected.

Tapping-mode atomic force microscopy (AFM) and scanning electron microscopy (SEM) analyses of the PAA films further corroborate the theoretical calculation of $V_{NaOH}$. As can be seen in FIG. 3A, AFM topography images show a smooth featureless film surface morphology for values of pH up to 12. Small spherical NaOH crystals can be seen in the thin film spin-cast from polymer solution with excess NaOH added. SEM images are used to confirm surface morphology as well as investigate the potential presence of NaOH crystals buried within the film (FIG. 3B). No sign of NaOH crystals is observed except for the sample with excess NaOH added, which is consistent with the AFM topography images. Focused ion beam (FIB)-assisted cross-sectional SEM for a pH 10 sample did not show any NaOH crystal beneath the gold heater lines, ruling out the possibility of preferential crystallization of NaOH due to heterogeneous nucleation at the metal-polymer interface (FIG. 3C).

The thermal conductivities of chain-extended PAA films are compared with those of two types of composite films, PAA/NaCl and PVP/NaOH, composed of mutually unreactive polymer-salt mixtures. It is assumed that the salt added in these samples is proportionally retained in the thin film upon spin-casting from the polymer-salt solution and acts as a high-κ filler.

As shown in FIG. 4A, salt fillers have miniscule effect on composite thermal conductivities until about 20% filler volume fraction. This signifies that extended chain morphology may be more effective at transferring heat than composite strategies, where large thermal resistances may exist at filler-filler and filler-polymer interfaces. The high thermal conductivities measured in chain extended PAA thin films can thus be attributed to ionization induced changes in the polymer chain conformation. Chain extension results in increased persistence length which increases the effective rigidity of the polymer chains. The extended and stiffened chains allow efficient vibrational transfer of heat over larger length scales along the polymer backbone, resulting in significantly enhanced κ. The measured increases in thermal conductivity are consistent with a recent computational study that predicts large enhancements in thermal conductivity with increasing persistence length in amorphous polyethylene. Since the density- and modulus-related contributions are calculated to account for only about 69% enhancement in κ, the extended chain conformation itself is believed to be the predominant factor for the large enhancement in κ observed in PAA films at high pH. This finding is consistent with high κ reported in ultra-drawn polyethylene and nano-templated polythiophene nanofibers in which high thermal conductivities are generally attributed to molecular chain orientation along the fiber axis.

As a demonstration of the applicability and potential for fabricating practically relevant thicker films, about 1.5 μm to about 5.5 μm thick PAA (MW about 450 kDa, atactic) films are formed by blade-coating, which is a method representative of large-scale roll-to-roll processing. As shown in FIG. 4B, a thermal conductivity measured for the pH 1 blade-coated samples (approximately 0.12 W/m·K) is approximately 3 times smaller than that for the spin-cast film at the same pH. This lower κ in the blade-coated sample is speculated to result from the thermodynamic nature of the blade-coating method. While spin-casting freezes the polymer chains in a thermodynamically high energy state upon rapid solvent evaporation, blade-coating is a slow process in which the chains can relax into a more thermodynamically favorable coiled-up morphology upon slow evaporation of the solvent.

It is noted that thermal conductivities of blade-coated high pH samples match closely with those measured for ionically-crosslinked PAA films, indicating a thermal conductivity enhancement that can be largely ascribed to elastic modulus- and density-related contributions. This is in line with the slow evaporation process during blade-coating that allows the chains to relax into a more thermodynamically favorable coiled-up morphology, as opposed to spin-casting that freezes the polymer chains in an extended high energy state upon rapid solvent evaporation. This is further consistent with the decline in κ observed for the spin-cast films subjected to solvent vapor annealing that relaxes the extended chain morphology.

The average thermal conductivity measured for high pH samples (pH 7-12) is about 0.59 W/m·K, which is nearly 80% enhancement over the average κ (~0.33 W/m·K) measured for the pH 1 samples. The highest κ (0.62±0.02 W/m·K) measured among the thick films is more than 50% larger than the κ (~0.4 W/m·K) achieved in un-stretched ultra-high MW semi-crystalline (crystallinity of about 15%) polyethylene (UHMWPE) films of comparable thickness. Theoretical calculations of NaOH content ($V_{NaOH}$) for the blade-coated films along with grazing incidence x-ray diffraction (GIXRD), calorimetry and thermo-gravimetry analyses ruled out contributions to κ from NaOH crystals or potential polymer crystallization.

The present disclosure thus provides an unexplored route for molecular engineering of polymer thermal conductivity. By utilizing an electrostatic field along the polymer backbone, electrostatic repulsive forces stretch the polyelectrolyte backbone at the molecular level to an extended polymer chain morphology from amorphous and unaligned systems. This results in extended conformations, better packed chains and enhanced modulus, all of which contribute to significantly enhance thermal conductivities (κ). It is to be noted that centrifugal forces during spin-casting may cause polymer chains to be more expanded in the in-plane direction, possibly making in-plane thermal conductivity even greater than the measured cross-plane κ. This unexplored route for molecular engineering of polymer thermal conductivity is also extended to making micron-thick blade-coated films, with thermal conductivity reaching over 0.6 $Wm^{-1}K^{-1}$, where a thickness may be in excess of about 1 µm, optionally greater than or equal to about 1.5 µm, optionally greater than or equal to about 2 µm, optionally greater than or equal to about 3 µm, optionally greater than or equal to about 4 µm, optionally greater than or equal to about 5 µm, and in certain variations, optionally greater than or equal to about 6 µm.

In alternative aspects, the present disclosure further contemplates molecularly engineered high thermal conductivity polymers formed from precursors that have a monomer or bound group that reacts to an external field, such as a magnetic field or electrophoretic field. For example, the polymer may have pendant groups that are magnetic (e.g., contain iron) or otherwise charged and the individual chains bearing such groups may thus orient and align to a desired conformation in the presence of such an external field. Such preferential orientation and alignment of polymer chains is believed to be capable of enhancing thermal conductivity in the alignment direction. This externally-induced change in the thermal conductivity is also reversible if the conformation change in the polymer is reversible.

Various embodiments of the inventive technology can be further understood by the specific examples contained herein. Specific Examples are provided for illustrative purposes of how to make and use the compositions, devices, and methods according to the present teachings and, unless explicitly stated otherwise, are not intended to be a representation that given embodiments have, or have not, been made or tested.

Example 1

The polymer (PAA or PVP) is dissolved in de-ionized (DI) water and the solution pH adjusted to desired values by addition of 1M HCl or 1M NaOH. The final solution concentration is then made up to 0.5 wt. % (PAA) or 1 wt. % (PVP). The final solution pH is checked using pH strips. Polymer solutions are then spin-cast on pre-cleaned Si wafers (approximately 100 nm $SiO_2$ layer) at 1500 r.p.m. for 30 seconds, and the resulting films are annealed at 100° C. for 1 hour. Spin-casting and annealing steps are done in a glove box under nitrogen atmosphere. Part of the film is removed using a steel blade, and the cleared area is further cleaned by a cotton swab dipped in water and ethanol to give a clean polymer-free reference region. Thin heater lines are deposited using a shadow mask (50 µm) and electron beam deposition (5 nm Ti/200 nm Au) on both sample and reference region.

To test potential ambient humidity dependence, a second series of samples also include a 50 nm thick alumina capping layer that is sputter-coated on the polymer layer before the metal heater lines are deposited. The blade-coated samples are prepared on a Newmark Systems Inc. (Model MS-1-24) computer-controlled blade-coater. Briefly, the required amount of polymer solution is placed on the substrate, which is kept on a hot plate at 90° C. Blade height is then adjusted to give the desired thickness, with a coating speed of 0.02 $mms^{-1}$. The coated films are annealed at 100° C. for 1 to 2 hours. Polymer-salt films are similarly prepared by first dissolving the polymers in DI water and then adding salt solution to attain the desired salt content.

The thermal conductivities of the spin-cast and blade-coated films are measured by 3ω method. Two different configurations with different layer structures are used to get reliable data. Error analyses for 3ω data are conducted. The film thicknesses of spin-cast films are measured by ellipsometry (Woollam M-2000DI Ellipsometer) and profilometry (Dektak XT Surface Profilometer). Only the latter is used for the blade-coated films because of their increased surface roughness. FTIR spectra are obtained on a Nicolet 6700 spectrometer with a grazing incidence of 85°. Polymer solution viscosity is measured on TA Instruments Advantage Rheology G2 with a steel cone of 40 mm diameter and cone angle of 2°. Different shear rates are used to obtain reliable viscosity data. Film porosity is measured by positronium annihilation lifetime spectroscopy (PALS) using a focused positron beam with implantation energy of 0.7 keV. Elastic modulus for the blade-coated films was measured on HYSITRON 950 triboindenter equipped with a Berkovich probe and at fixed displacement of 400 nm. Tapping-mode AFM (Bruker ICON AFM) and SEM (Bruker ICON AFM) are used to study film morphologies. Focused ion beam (FIB)-assisted SEM (FEI Nova Nanolab 200 FIB/SEM) is used to image the cross-sections of PAA films beneath the gold heater lines. GIXRD is performed on a Rigaku Ultima IV X-ray Diffractometer. Calorimetry and thermo-gravimetry are done on TA Instruments Series DSC and TGA, respectively.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of increasing thermal conductivity of a bulk polymer comprising:
    contacting a bulk polyelectrolyte polymer that is a polyanion comprising a repeating ionizable pendant group with an aqueous liquid having a pH greater than 7 that ionizes the pendant group and isotropically extends the polyelectrolyte polymer to an extended non-globular chain conformation so that the polyelectrolyte polymer exhibits a thermal conductivity of greater than or equal to about 0.6 W/m·K.

2. The method of claim 1, wherein the contacting with the aqueous liquid having the pH increases a thermal conductivity of the bulk polyelectrolyte polymer by at least four times greater than an initial thermal conductivity prior to the contacting.

3. The method of claim 1, wherein the contacting further comprises combining the bulk polyelectrolyte polymer with the aqueous liquid and at least one base to form an admixture.

4. The method of claim 3, wherein the at least one base is added to the aqueous liquid to increase pH to greater than or equal to about 12.

5. The method of claim 3, further comprising spin casting the admixture onto a substrate to form a solid film of the polyelectrolyte polymer having the extended non-globular chain conformation having the thermal conductivity of greater than or equal to about 1 W/m·K.

6. The method of claim 5, wherein the solid film has a thickness of greater than or equal to about 10 nm to less than or equal to about 35 nm.

7. The method of claim 3, further comprising blade coating the admixture onto a substrate to form a solid film of the polyelectrolyte polymer having the extended non-globular chain conformation with the thermal conductivity of greater than or equal to about 0.6 W/m·K.

8. The method of claim 7, wherein the solid film has a thickness of greater than or equal to about 1.5 μm to less than or equal to about 6 μm.

9. The method of claim 1, wherein the bulk polyelectrolyte polymer comprises polyacrylic acid (PAA).

10. The method of claim 1, wherein the bulk polyelectrolyte polymer is present at greater than or equal to about 0.5% by weight to less than or equal to about 2% by weight in the aqueous liquid.

11. A method of increasing thermal conductivity of a bulk polymer comprising:
contacting a bulk polyelectrolyte polymer comprising a repeating ionizable pendant group with an aqueous liquid having a pH that ionizes the pendant group and isotropically extends the polyelectrolyte polymer to an extended non-globular chain conformation so that the polyelectrolyte polymer exhibits a thermal conductivity of greater than or equal to about 0.6 W/m·K and the contacting occurs until a relative viscosity ($\eta_r$) of the bulk polyelectrolyte polymer to water is greater than or equal to about 6.5.

12. The method of claim 11, wherein the contacting further comprises combining the bulk polyelectrolyte polymer with the aqueous liquid and at least one acid or base to form an admixture.

13. The method of claim 12, wherein the bulk polyelectrolyte polymer is a polyanion and at least one base is added to the aqueous liquid to increase pH to greater than or equal to about 12.

14. The method of claim 12, further comprising spin casting the admixture onto a substrate to form a solid film of the polyelectrolyte polymer having the extended non-globular chain conformation having the thermal conductivity of greater than or equal to about 1 W/m·K.

15. The method of claim 11, wherein further comprising blade coating the admixture onto a substrate to form a solid film of the polyelectrolyte polymer having the extended non-globular chain conformation with the thermal conductivity of greater than or equal to about 0.6 W/m·K.

16. The method of claim 11, wherein the bulk polyelectrolyte polymer comprises polyacrylic acid (PAA).

17. The method of claim 11, wherein the bulk polyelectrolyte polymer is present at greater than or equal to about 0.5% by weight to less than or equal to about 2% by weight in the aqueous liquid.

18. A method of increasing thermal conductivity of a bulk polymer comprising:
contacting a bulk polyelectrolyte polymer that is a polycation comprising a repeating ionizable pendant group with an aqueous liquid having a pH of less than 7 that ionizes the pendant group and isotropically extends the polyelectrolyte polymer to an extended non-globular chain conformation so that the polyelectrolyte polymer exhibits a thermal conductivity of greater than or equal to about 0.6 W/m·K, wherein the polycation is selected from the group consisting of: arginine, asparagine, aspartic acid, glutamic acid, glutamine, histidine, lysine, serine, threonine, and/or tyrosine, and combinations thereof.

19. The method of claim 18, wherein the contacting further comprises combining the bulk polyelectrolyte polymer with the aqueous liquid and at least one acid to form an admixture.

20. The method of claim 18, wherein at least one acid is added to the aqueous liquid to reduce pH to less than or equal to about 5.

* * * * *